United States Patent
Saitou et al.

[19]

[11] Patent Number: 6,128,559
[45] Date of Patent: Oct. 3, 2000

[54] AUTOMATIC VEHICLE FOLLOWING CONTROL SYSTEM

[75] Inventors: Tooru Saitou; Hideki Hashimoto, both of Utsunomiya, Japan

[73] Assignee: Honda Giken Kogyo Kabushiki Kaisha, Tokyo, Japan

[21] Appl. No.: 09/404,764

[22] Filed: Sep. 24, 1999

[30] Foreign Application Priority Data

Sep. 30, 1998 [JP] Japan .................................. 10-278102

[51] Int. Cl.⁷ .................................................. G06F 15/00
[52] U.S. Cl. .......................... 701/23; 701/301; 701/200; 701/29; 701/1; 340/903; 340/436
[58] Field of Search .............................. 701/23, 200, 22, 701/29, 1, 301; 340/903, 436

[56] References Cited

U.S. PATENT DOCUMENTS

| | | | |
|---|---|---|---|
| 4,987,540 | 1/1991 | Luke, Jr. .................................. | 701/24 |
| 5,170,351 | 12/1992 | Nemoto et al. ........................ | 701/23 |
| 5,502,432 | 3/1996 | Ohmamyuda et al. ................. | 340/436 |
| 5,539,399 | 7/1996 | Takahira et al. ....................... | 340/995 |
| 5,546,311 | 8/1996 | Sekine .................................... | 701/208 |
| 5,627,510 | 5/1997 | Yuan ....................................... | 340/435 |
| 5,684,473 | 11/1997 | Hibino et al. .......................... | 340/903 |
| 5,778,326 | 7/1998 | Moroto et al. ......................... | 701/22 |
| 5,808,565 | 9/1998 | Matta et al. ........................... | 340/994 |
| 5,832,396 | 11/1998 | Moroto et al. ......................... | 701/22 |
| 5,867,089 | 2/1999 | Zyburt et al. ......................... | 340/323 R |
| 5,926,112 | 7/1999 | Hartzell ................................. | 340/902 |
| 5,957,983 | 9/1999 | Tominaga .............................. | 701/23 |
| 5,995,883 | 11/1999 | Nishikado ............................. | 701/23 |
| 6,014,597 | 1/2000 | Kochanneck .......................... | 701/22 |
| 6,038,502 | 3/2000 | Sudo ..................................... | 701/23 |

FOREIGN PATENT DOCUMENTS 0 652 543  5/1995  European Pat. Off. .
0 698 542  2/1996  European Pat. Off. .

*Primary Examiner*—William A. Cuchlinski, Jr.
*Assistant Examiner*—Olga Hernandez
*Attorney, Agent, or Firm*—Arent Fox Kintner Plotkin & Kahn, PLLC

[57] ABSTRACT

When vehicles run in a platoon, a status indicative of a malfunction or the like of a following vehicle is transmitted to a leading vehicle, so that the leading vehicle can take an appropriate action. Specifically, an automatic vehicle following control system controls a plurality of unattended following vehicles, each comprising an electric vehicle, to run in tandem in follow mode to an attended leading vehicle. Each of said following vehicles has a remaining capacity detecting unit for detecting a remaining capacity of a battery on the following vehicle, and transmitting information of the detected remaining capacity via vehicle-to-vehicle antennas to the leading vehicle. The remaining capacities of the batteries on the following vehicles are displayed on a display unit of the leading vehicle. When a remaining capacity of a battery on an electric vehicle is lowered, since the maximum output power of a motor on the electric vehicle is reduced, the electric vehicle cannot run in a platoon at a high speed. If the remaining capacity of the battery on the electric vehicle is detected as being lower than a predetermined level, then the speed of the leading vehicle is automatically lowered to enable the following vehicles to run continuously in a platoon at a relatively low speed.

10 Claims, 19 Drawing Sheets

FIG. 11

132 VEHICLE TRAVEL INFORMATION TABLE

| No. | TRAJECTORY DATA | | | | MANIPULATED VARIABLE DATA | | | TIME |
|---|---|---|---|---|---|---|---|---|
| | POSITION | | DIRECTION | | ACCELERATOR | BRAKE | STEERING WHEEL | |
| | X | Y | θ | | T (Nm) | P (N/m$^2$) | ω (deg) | |
| 1 | X1 | Y1 | θ1 | | T1 | P1 | ω1 | t1 |
| 2 | X2 | Y2 | θ2 | | T2 | P2 | ω2 | t2 |
| 3 | X3 | Y3 | θ3 | | T3 | P3 | ω3 | t3 |
| ......... | ......... | ......... | ......... | | ......... | ......... | ......... | ......... |
| 3000 | X3000 | Y3000 | θ3000 | | T3000 | P3000 | ω3000 | t3000 |

EXTRACTION OF MANIPULATED VARIABLE

AUTOMATIC VEHICLE FOLLOWING CONTROL SYSTEM

BACKGROUND OF THE INVENTION

1. Field of the Invention

The present invention relates to an automatic vehicle following control system which comprises a leading vehicle driven by a driver and a platoon of following vehicles running in follow mode to the leading vehicle.

2. Description of the Related Art

In recent years, there have been proposed automatic vehicle following control systems for controlling a platoon of unattended following vehicles to automatically run in follow mode to an attended leading vehicle driven by a driver. The proposed automatic vehicle following control systems are effective to make the following vehicles free of any human drivers.

One known automatic vehicle following control system is disclosed in Japanese laid-open patent publication No. 5-170008, for example. According to the disclosed automatic vehicle following control system, the leading vehicle transmits information as to its manipulated variables, such as a steered quantity, a throttle valve opening, etc. and its running status variables such as a vehicle speed, a vehicle acceleration, etc. to the following vehicles, and each of the following vehicles controls its own manipulative variables and an engine control variable thereof in a feed-forward control mode to follow the leading vehicle along the same trajectory as the leading vehicle, based on the transmitted manipulated and running status variables of the leading vehicle and the running status variables of the following vehicle.

Another known automatic vehicle following control system is revealed in Japanese laid-open patent publication No. 10-172099. The revealed automatic vehicle following control system determines a predicted position of a following vehicle after a predicted period of time, calculates a lateral error or deviation of the predicted position from the trajectory of a leading vehicle, and controls the direction of travel of the following vehicle in order to reduce the calculated lateral error.

In the above known automatic follow-mode vehicle control systems, it is presupposed that the following vehicles are capable of running in follow mode to the leading vehicle without fail, and care is taken to avoid intra-platoon collisions such as a collision between the leading vehicle and the following vehicles and a collision between the following vehicles.

However, the conventional automatic follow-mode vehicle control systems do not take into account any vehicle follow-up control details in the event of a malfunction of either one of the following vehicles in the platoon.

SUMMARY OF THE INVENTION

It is therefore an object of the present invention to provide an automatic vehicle following control system which is capable of taking an appropriate action depending on a malfunction of a following vehicle.

According to the present invention, an indicating means on a leading vehicle indicates malfunction information of a following vehicle to the driver of the leading vehicle. The leading vehicle itself or the driver of the leading vehicle can thus recognize the malfunction of the following vehicle and quickly take an appropriate action.

If the failure information contains status information indicative of a malfunction of at least one following vehicle, then a speed limiting means may limit the speed of travel of the leading vehicle.

If there are a plurality of following vehicles, then the indicating means may identify and indicate at least one of the following vehicles which is suffering a malfunction, so that the leading vehicle itself or the driver of the leading vehicle can recognize the following vehicle which is malfunctioning.

According to the present invention, furthermore, the leading vehicle itself or the driver of the leading vehicle can recognize the remaining capacity of a battery on each of the following vehicles, and hence can take an appropriate action depending on the remaining capacity of the battery on each of the following vehicles.

If the remaining capacity of the battery on at least one of the following vehicles is lower than a predetermined level, then the indicating means on the leading vehicle can indicate the reduction in the remaining capacity for thereby enabling the leading vehicle itself or the driver of the leading vehicle to take an appropriate action depending on the reduction in the remaining capacity of the battery.

The speed limiting means on the leading vehicle may limit the speed of travel of the leading vehicle when the remaining capacity of the battery on at least one of the following vehicles is lower than the predetermined level.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 is a diagram showing a vehicle travel information table of trajectory data and manipulated variable data which are stored in pairs;

DESCRIPTION OF THE PREFERRED EMBODIMENT

Figure 1:
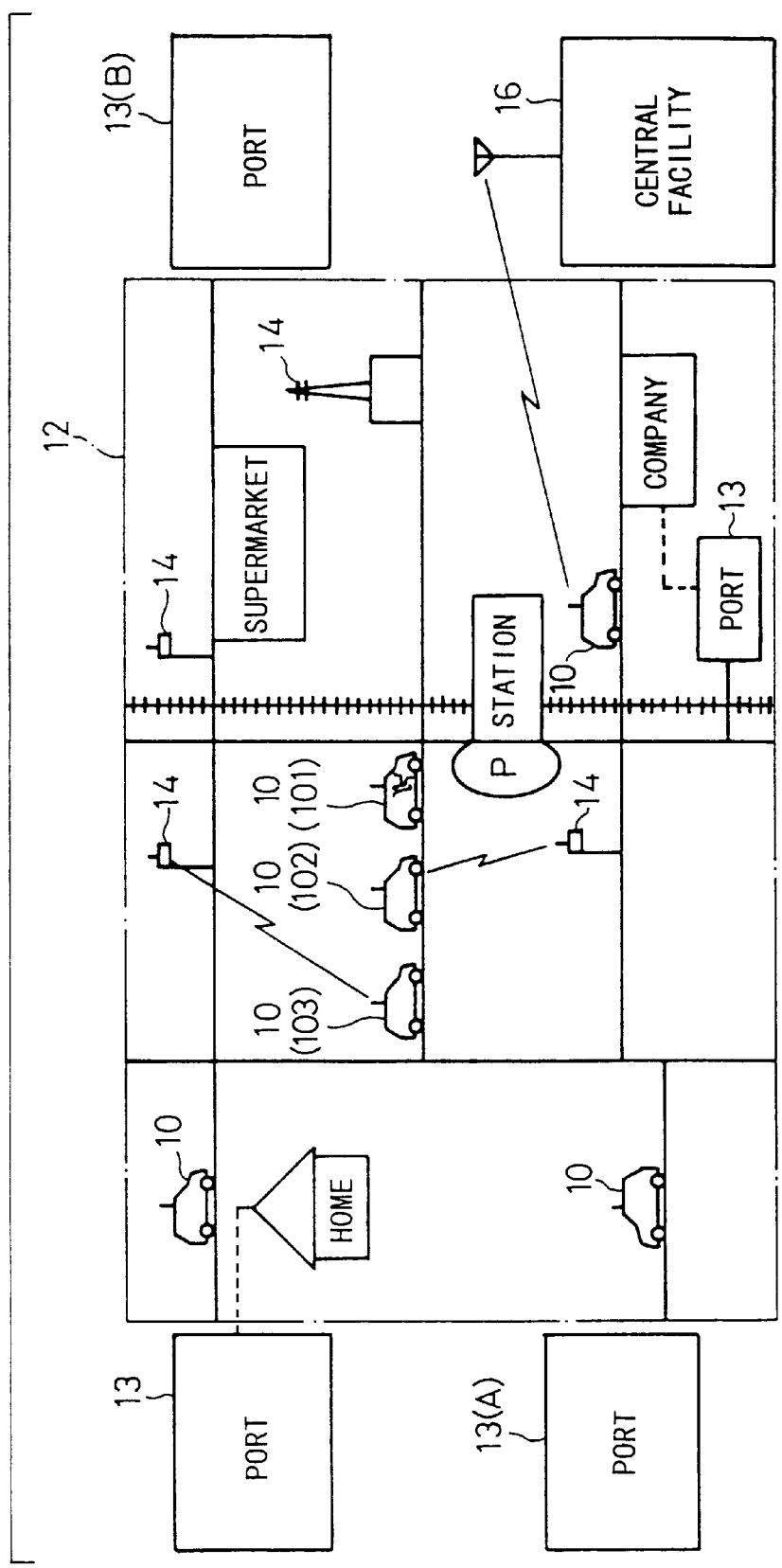
FIG. 1 is a schematic plan view of an electric vehicle sharing system which incorporates the principles of the present invention.

FIG. 1 schematically shows an electric vehicle sharing system which incorporates the principles of the present invention.

The electric vehicle sharing system shown in FIG. 1 is a system for allowing a plurality of users to share a plurality of electric vehicles 10 of identical specifications. The electric vehicle sharing system covers an area 12 where the users can drive the available electric vehicles 10. The area 12 is combined with a plurality of ports 13 where a plurality of electric vehicles 10 can be parked. A user, i.e., a driver, rents an electric vehicle 10 from a port 13 near the driver's house or company, drives the electric vehicle 10 from the port 13 on a facing-traffic road to a nearby station or supermarket, for example, accomplishes whatever the purpose may be, and thereafter returns the electric vehicle 10 to a nearby port 13.

The area 12 contains a plurality of communication means 14 for transmitting and receiving information relative to the status of usage of the electric vehicles 10 by way of suitable communications. The received information is sent from the communication means 14 to a central facility 16 of the electric vehicle sharing system.

Figure 2:
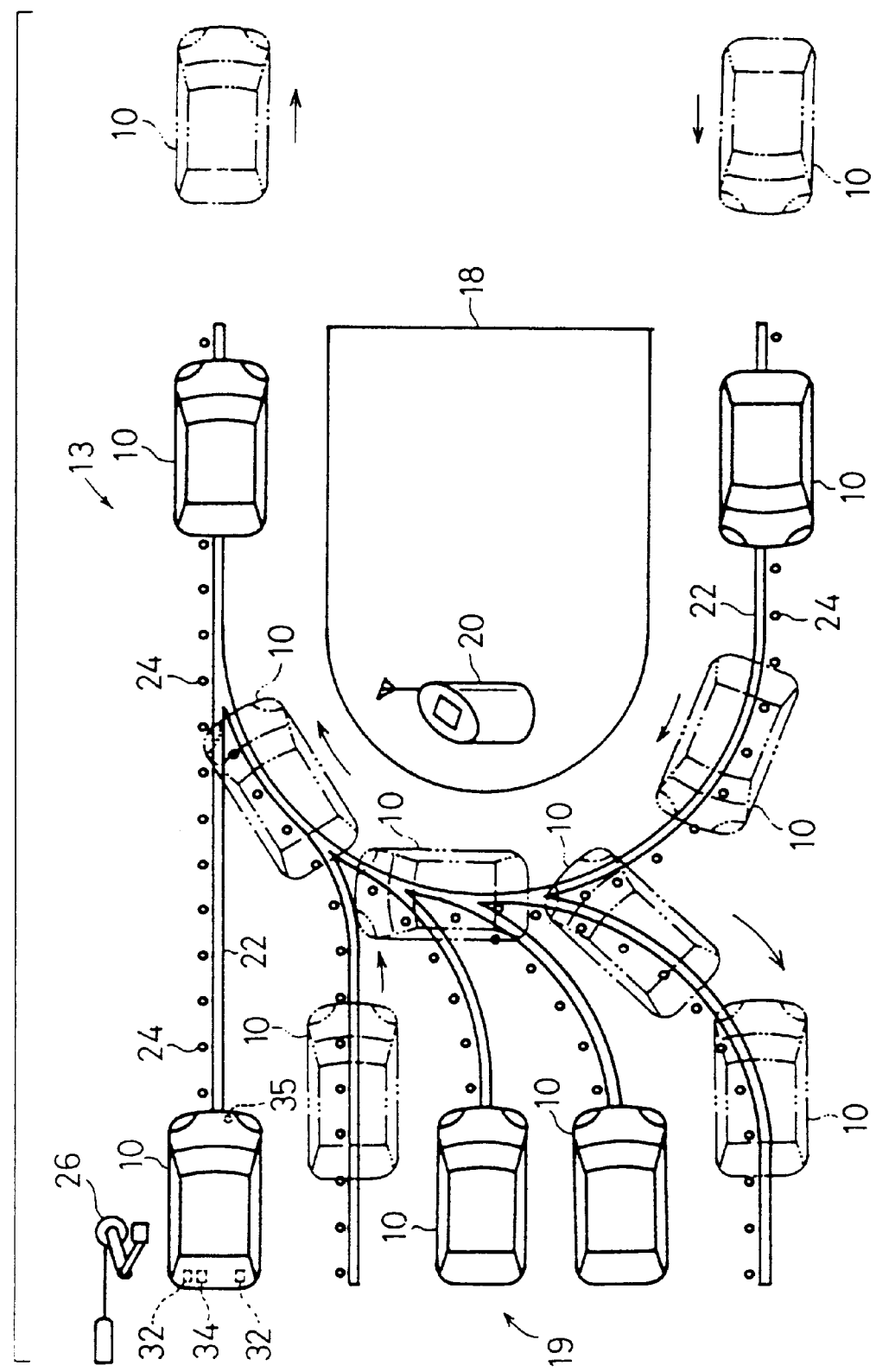
FIG. 2 is a schematic plan view of a port for storing electric vehicles, of the electric vehicle sharing system.

FIG. 2 schematically shows in plan structural details of each of the ports 13. As shown in FIG. 2, the port 13 comprises a platform 18 where users rent and return electric vehicles 10, and a plurality of parking areas 19 for pooling a plurality of electric vehicles 10. The platform 18 has a port terminal control unit 20 for performing vehicle renting and returning processes. Specifically, a user rents a desired electric vehicle 10 or returns a used electric vehicle 10, using an IC (Integrated Circuit) card storing usage information, etc., at the port terminal control unit 20. The port terminal control unit 20 manages the number of electric vehicles 10 present in the port 13, and transmits the recognized number of electric vehicles 10 to the central facility 16 via a public communication network.

Induction cables 22 are embedded in each of the ports 13 between the platform 18 and the parking areas 19. The induction cables 22 are part of a road infrastructure for moving the electric vehicles 10 in an automatic drive mode (unattended drive mode). Magnetic nails 24 are also embedded in each of the ports 13 at certain spaced intervals along one side of the induction cables 22. One of the parking areas 19 is associated with a battery charger 26 for charging the battery on an electric vehicle 10 that is parked in the parking area 19.

As exemplified by the broken lines on the electric vehicle 10 that is parked near the battery charger 26, all the electric vehicles 10 have a pair of induction sensors 32 positioned near a rear bumper symmetrically with respect to the longitudinal axis of the electric vehicle, a magnetic sensor 34 positioned near the rear bumper and offset from the longitudinal axis of the electric vehicle to a position in alignment with the magnetic nails 24, and an ultrasonic sensor 35 positioned near a front bumper for preventing a collision with another electric vehicle.

When a departure command, for example, is supplied to an electric vehicle 10 from the port terminal control unit 20 by way of radio communications, the electric vehicle 10 determines a travel route based on a map in the port 13, and moves in the port 13 while confirming safety against a collision with the ultrasonic sensor 35, performing feedback control on its lateral position by detecting magnetic fluxes from the induction cable 22 with the induction sensors 32, and performing positional feedback control in the port 13 by detecting the magnetic nails 24 with the magnetic sensor 34. Such feedback control of the electric vehicle 10 is carried out when the electric vehicle 10 is moved in the automatic drive mode (unattended drive mode).

As a number of electric vehicles 10 are simultaneously over an increased period of time in the electric vehicle sharing system, there may be developed a situation where more electric vehicles 10 are present in a port 13 and fewer electric vehicles 10 are present in another port 13. The presence of more and fewer electric vehicles 10 in the ports is recognized by the central facility 16.

For example, it is assumed that more electric vehicles 10 are present in a port 13(A) positioned in a lower left region of the area 12 in FIG. 1 and fewer electric vehicles 10 are present in a port 13(B) positioned in an upper right region of the area 12. When this localized vehicle concentration occurs, it is preferable to transfer an excessive number of electric vehicles 10 from the port 13(A) to the port 13(B).

One approach would be to carry such an excessive number of electric vehicles 10 with a truck or the like to the port 13(B). However, a large expenditure of labor, time, and cost would be required to load those electric vehicles 10 on the truck or the like in the port 13(A) and unload those electric vehicles 10 from the truck or the like in the port 13(B). Another problem is that it is not preferable for a large and heavy vehicle such as a truck to run in the area 12 of the electric vehicle sharing system.

According to the illustrated embodiment, in order to uniformize the numbers of electric vehicles 10 in the ports 13 for thereby eliminating the localized vehicle concentration, the central facility 16 calls a driver belonging thereto by telephone, and instructs the driver to move the excessive electric vehicles 10 from the port 13(A) to the port 13(B) in a platoon, i.e., in tandem.

In such a vehicle platoon control process, an electric vehicle 10 as a leading vehicle, e.g., a leading vehicle 101 in FIG. 1, is driven by the driver, and other electric vehicles 10 as following vehicles, e.g., following vehicles 102, 103, are automatically driven, unattended or attended, in tandem to follow the attended leading vehicle 101. Of course, three or more electric vehicles 10 may be automatically driven in a platoon in follow mode to the leading vehicle.

Roads in the area 12 where electric vehicles 10 run in a platoon are not equipped with a road infrastructure including induction cables 22 and magnetic nails 24. Therefore, the vehicle platoon control process is carried out on facing-traffic roads in the area 12 which are similar to general roads.

Figure 3:
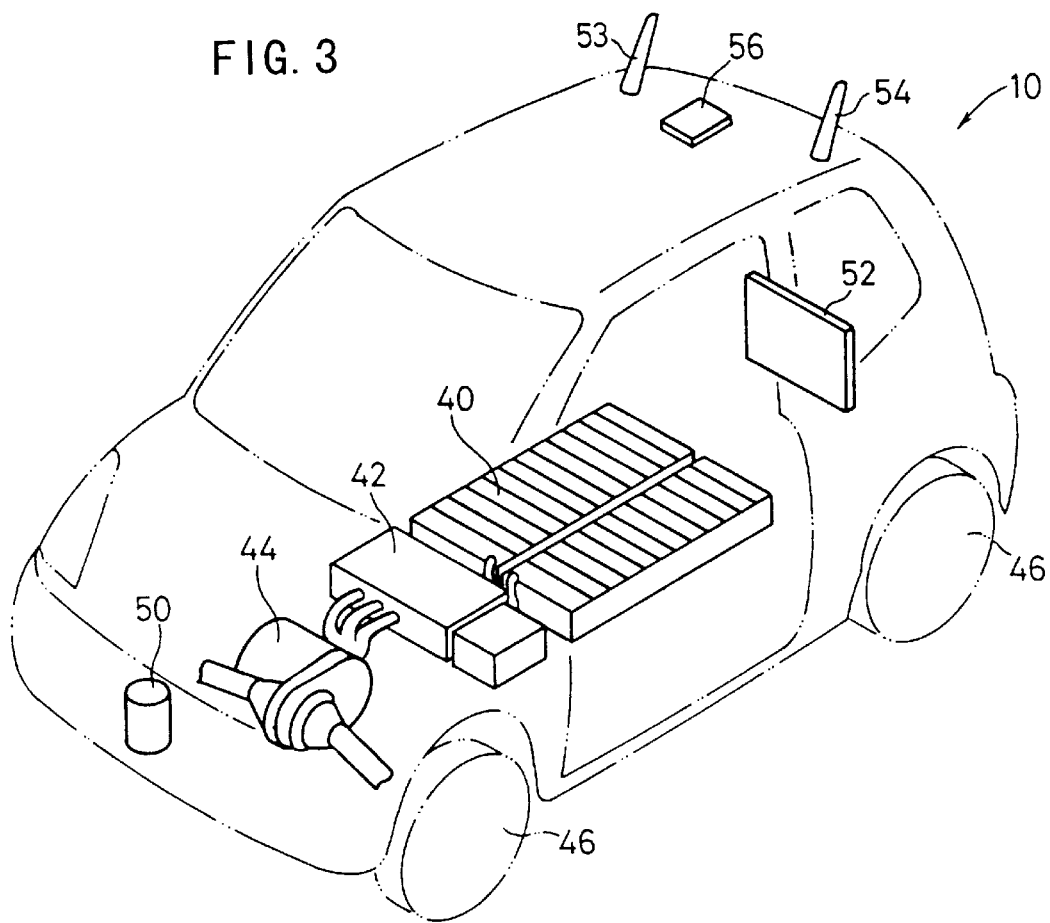
FIG. 3 is a perspective view of an electric vehicle employed in the electric vehicle sharing system.

FIG. 3 schematically shows each of the electric vehicles 10. The electric vehicle 10 is designed such that it can be driven either attended or unattended. When the electric vehicle 10 is in operation, electric energy from a battery 40 is supplied via a drive power control ECU (Electric Control Unit) 42 to a motor 44, which is energized to rotate road wheels 46 for thereby propelling the electric vehicle 10.

As shown in FIG. 3, the electric vehicle 10 has a laser radar (radar device) 50 disposed centrally in a front bumper thereof for scanning a wide-angle area, and a reflector 52 as a mirror-finish plate disposed centrally in a rear bumper thereof for reflecting a radar wave emitted from the laser radar 50 on a following vehicle. When the position (radar measurement point) of the reflector 52 of a preceding vehicle is picked up by the laser radar 50 of a following vehicle on a real-time basis, the position of the preceding vehicle, i.e., the distance up to the preceding vehicle, and the direction of the preceding vehicle with respect to the following vehicle can be detected on a real-time basis. Actually, the laser radar 50 and the reflector 52 in combination serve to detect the distance from the following vehicle to the preceding vehicle in the direction of travel and a lateral deviation of the following vehicle from the leading vehicle.

The electric vehicle 10 also has, mounted on a roof thereof, a vehicle-to-vehicle antenna 53 for radio communications between electric vehicles 10, a road-to-vehicle antenna 54 for radio communications with the communication means 14 and the central facility 16, and a GPS/DGPS (Global Positioning System/Differential GPS) antenna 56 for receiving radio waves from GPS satellites and DPGS stations.

Figure 4:
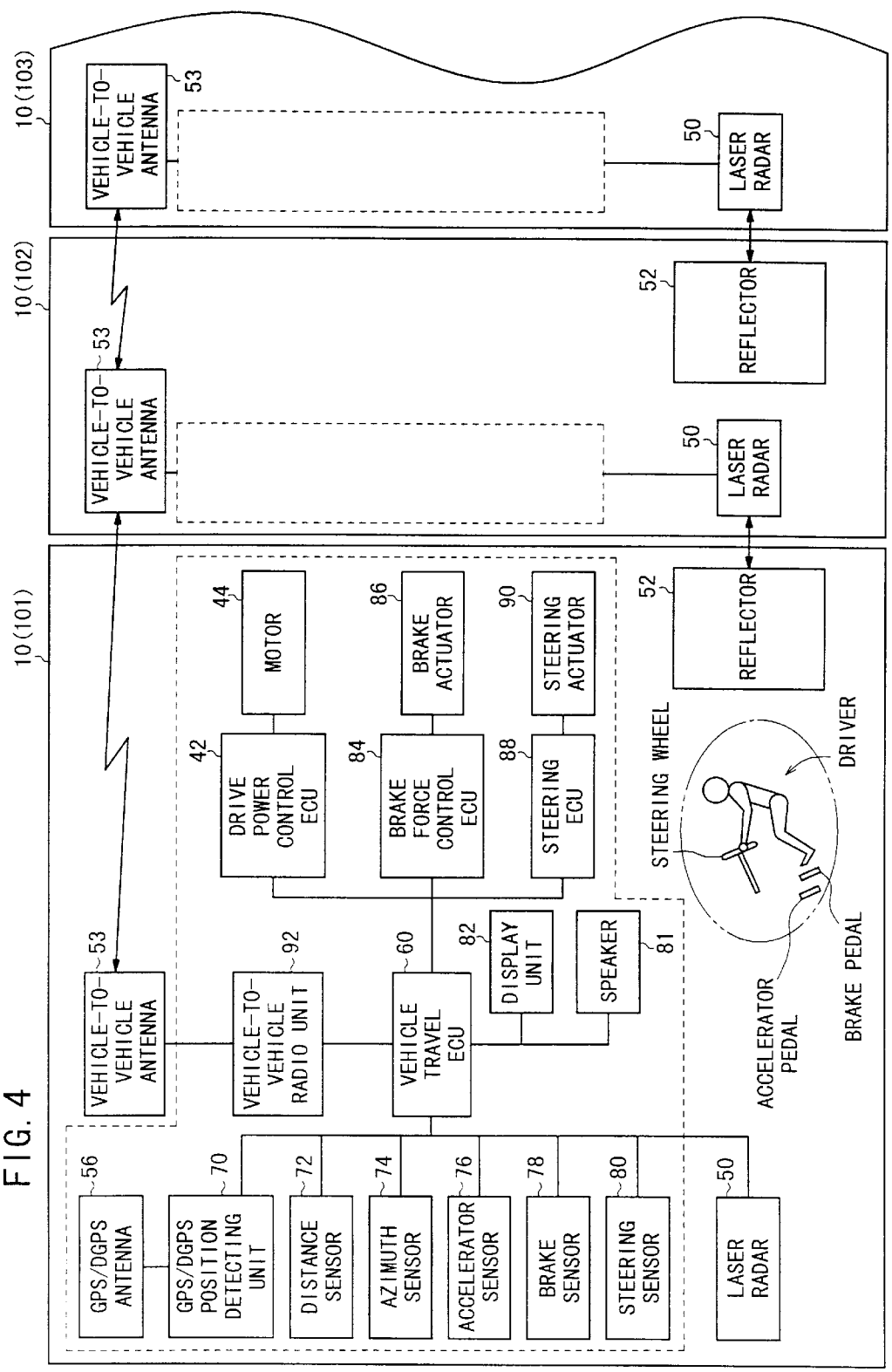
FIG. 4 is a block diagram of an internal structure of an electric vehicle, the diagram also showing a mutual communication relationship between electric vehicles running in a platoon.

FIG. 4 shows in block form an internal structure of each of the electric vehicles 10, which includes components relating to the vehicle platoon control process. Of electric vehicles 10 running in a platoon, the electric vehicle 10 driven by a driver and positioned at the leading end of the platoon is referred to as a leading vehicle 101, the electric vehicle 10 following the leading vehicle 101 is referred to as a following vehicle 102, and the electric vehicle 10 following the following vehicle 102 in the platoon is referred to as a following vehicle 103 (see also FIG. 1). In the embodiment, the leading vehicle 101 and the following vehicles 102, 103 comprise respective electric vehicles 10 of identical specifications (identical structure) and identical types. In FIG. 4, structural details in portions enclosed by broken lines in the following vehicles 102, 103 are identical to those in a portion enclosed by broken lines in the leading vehicle 101. Each of the electric vehicles 10 can be converted between the attended leading vehicle 101 that is manually controlled by the driver and the unattended following leading vehicles 102, 103 that are automatically controlled.

As shown in FIG. 4, each of the electric vehicles 10 has a vehicle travel ECU 60 as a general control processing means. To the vehicle travel EPU 60, there are connected a GPS/DGPS position detecting unit 70 for detecting the present position (latitude and longitude) of the electric vehicle 10, a distance sensor 72 for detecting a traveled distance of the electric vehicle 10 to calculate a travel speed thereof, an azimuth sensor 74 for detecting the direction of travel of the electric vehicle 10, an accelerator sensor 76 for detecting a control torque T (Nm) representing a manipulated variable of the motor 44 which corresponds to the accelerator pedal depression, a brake sensor 78 for detecting a brake oil pressure P representing a manipulated variable of the vehicle brake pedal, a steering sensor 80 for detecting a steered angle ω (degree) representing a manipulated variable of the steering wheel, and the laser radar 50.

In the embodiment, the GPS/DGPS position detecting unit 70 has a relatively low position detecting accuracy of about 1 m, so that it is not used for a vehicle following control process (the feedback and feed-forward control process) while the electric vehicles 10 are running in a platoon. The electric vehicle 10 has a navigation system including a speaker 81 for outputting a voice guidance and a display unit 82 for displaying a map. The GPS/DGPS position detecting unit 70 is used to display the position of the electric vehicle on the map displayed by the display unit 82, so that the central facility 16 can confirm the present position of the vehicle platoon in the area 12.

Depending on the control torque T (Nm) detected by the accelerator sensor 76, the vehicle travel ECU 60 controls the rotational speed of the motor 44 via the drive power control ECU 42. Depending on the brake oil pressure P detected by the brake sensor 78, the vehicle travel ECU 60 controls braking forces produced by a brake actuator 86 via a brake force control ECU 84. Depending on the steered angle ω detected by the steering sensor 80, the vehicle travel ECU 60 controls a steering actuator 90 via a steering ECU 88.

The accelerator sensor 76 and the brake sensor 78 may be replaced with an acceleration/deceleration sensor, and an output signal from the acceleration/deceleration sensor may be integrated into an integral signal that can be used in place of output signals from the accelerator sensor 76 and the brake sensor 78. The steering sensor 80 may be replaced with a yaw rate sensor, and an output signal from the yaw rate sensor may be integrated into an integral signal that can be used in place of an output signal from the steering sensor 80. The distance sensor 72 may be replaced with a speed sensor, and an output signal from the speed sensor may be integrated into an integral signal that can be used in place of an output signal from the distance sensor 72.

Figure 5:
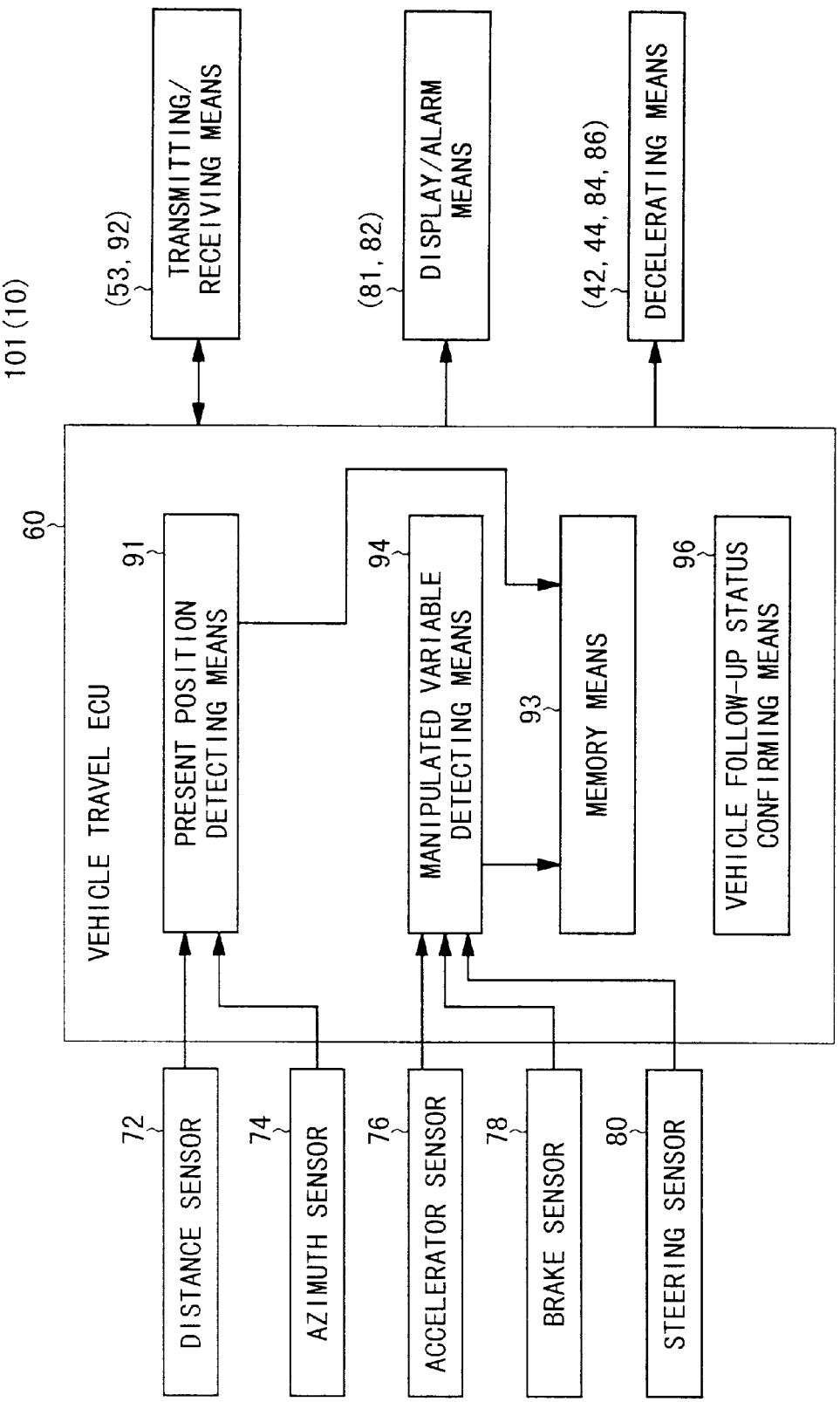
FIG. 5 is a block diagram of an entire systematic arrangement of a leading vehicle in a platoon, the diagram also showing details of a vehicle travel ECU of the leading vehicle.

FIG. 5 shows in block form an entire systematic arrangement of the leading vehicle 101 which is involved in a vehicle following control process.

As shown in FIG. 5, the travel control ECU 60 of the leading vehicle 101 has a present position (leading vehicle position) detecting means 91 for detecting a leading vehicle position (X, Y) and a direction (azimuth) θ in which the leading vehicle is oriented at certain time intervals (10 ms) based on output signals from the distance sensor 72 and the azimuth sensor 74, and stores the detected position and direction as trajectory data in a memory means 93 which comprises a ring buffer.

The travel control ECU 60 of the leading vehicle 101 also has a manipulated variable detecting means 94 for detecting manipulated variables (T, P, ω) from the accelerator sensor 76, the brake sensor 78, and the steering sensor 80, which represent a control torque produced by the accelerator pedal, a brake oil pressure produced by the brake pedal, and a steered angle of the steering wheel, and storing the detected variables as paired up with the trajectory data (the leading vehicle position (X, Y) and the direction θ) in the memory means 93.

The trajectory data (the leading vehicle position (X, Y) and the direction θ) and the manipulated variables (T, P, ω) which are detected on the leading vehicle 101 are transmitted via a vehicle-to-vehicle radio unit 92 (see FIG. 4) and the vehicle-to-vehicle antenna 53, which jointly function as a transmission/reception means, to the vehicle travel ECUs 60 of the following vehicles 102, 103.

Data of the statues of the following vehicles 102, 103 are supplied via the vehicle-to-vehicle antenna 53 and the vehicle-to-vehicle radio unit 92 to a vehicle follow-up status confirming means 96 in the vehicle travel ECU 60 of the leading vehicle 101. Depending on the confirmed vehicle follow-up statuses, the vehicle travel ECUs 60 energizes the display unit 82 and the speaker 81 which jointly function as a display/alarm means of the navigation system, and also energizes the drive power control ECU 42, the motor 44, the brake force control ECU 84, and the actuator 86 which jointly function as a decelerating means or a stopping means.

Figure 6:
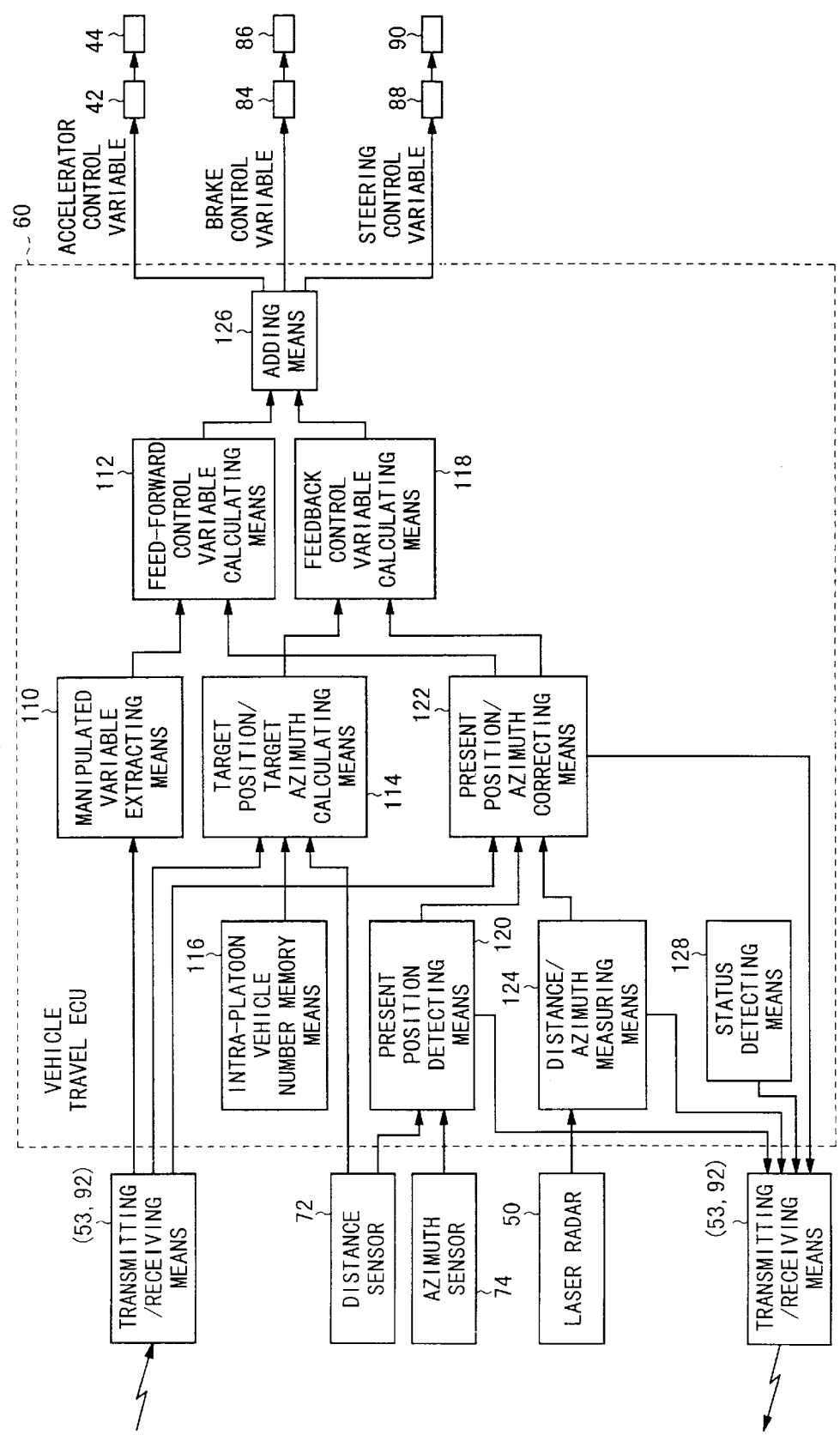
FIG. 6 is a block diagram of an entire systematic arrangement of a following vehicle in a platoon, the diagram also showing details of a vehicle travel ECU of the following vehicle.

FIG. 6 shows in block form an entire systematic arrangement of each of the following vehicles 102, 103 which is involved in a vehicle following control process.

In the electric vehicle 10 as the following vehicle 102 (103), the transmission/reception means 53, 92 receives trajectory information of the preceding vehicle, manipulated variables of the leading vehicle 101, and a coordinate deviation (described later on) from the preceding vehicle. The preceding vehicle which precedes the following vehicle 102 is the leading vehicle 101, and the preceding vehicle which precedes the following vehicle 103 is the following vehicle 102. Therefore, the term "preceding vehicle" used herein means a vehicle which precedes the vehicle that is being discussed (the following vehicle 102 or 103).

In the following vehicle 102 (103), the manipulated variables of the leading vehicle 101 are extracted by a manipulated variable extracting means 110 and supplied to a feed-forward control variable calculating means 112.

A target position/target azimuth calculating means 114 calculates a target position and a target azimuth in the trajectory information of the leading vehicle, which has an intra-platoon vehicle number 1, as a target for the vehicle being discussed, from an intra-platoon vehicle number of the vehicle being discussed (e.g., the following vehicle 102 has an intra-platoon vehicle number 2, and the following vehicle 103 has an intra-platoon vehicle number 3) from an intra-platoon vehicle number memory means 116 and the traveled distance from the distance sensor 72, and supplies the target position and the target azimuth to a feedback control variable calculating means 118.

A present position detecting means 120 detects a position (X, Y) of the vehicle being discussed and a direction θ in which the vehicle being discussed is oriented at certain time intervals (10 ms) based on output signals from the distance sensor 72 and the azimuth sensor 74 of the vehicle being discussed, and supplies the detected position and direction to a present position/azimuth correcting means 122.

A distance/azimuth measuring means 124 measures a distance and an azimuth of the vehicle being discussed with respect to the preceding vehicle from an output signal from the laser radar 50, and supplies the measured distance and azimuth to the present position/azimuth correcting means 122.

The present position/azimuth correcting means 122 corrects the present position and azimuth of the vehicle being discussed based on the trajectory information of the preceding vehicle, the coordinate deviation, the position (X, Y) and azimuth θ of the vehicle being discussed, and the measured distance and azimuth with respect to the preceding vehicle.

Based on an output signal from the manipulated variable extracting means 110 and a corrected present position outputted from the present position/azimuth correcting means 122, the feed-forward control variable calculating means 112 calculates feed-forward control variables, and supplies the calculated feed-forward control variables to an input terminal of an adding means 126.

Based on a target position and a target azimuth outputted from the target position/target azimuth calculating means 114 and a corrected present position and a corrected azimuth outputted from the present position/azimuth correcting means 122, the feedback control variable calculating means 118 calculates feedback control variables, and supplies the calculated feedback control variables to another input terminal of the adding means 126.

The adding means 126 supplies an accelerator control variable represented by the sum of the feed-forward control variables and the feedback control variables, and supplies the accelerator control variable via the drive power control ECU 42 to the motor 44. The adding means 126 also supplies a brake control variable represented by the sum of the feed-forward control variables and the feedback control variables, and supplies the brake control variable via the brake force control ECU 84 to the brake actuator 86. The adding means 126 supplies a steering control variable represented by the sum of the feed-forward control variables and the feedback control variables, and supplies the steering control variable via the steering control ECU 88 to the steering actuator 90.

Status abnormalities of the following vehicle 102 (103) and a remaining capacity of the battery 40 thereof are detected by a status detecting means 128. The detected status abnormalities and remaining capacity are transmitted, together with the distance up to the preceding vehicle measured by the distance/azimuth measuring means 124, via the transmitting/receiving means 53, 92 to the leading vehicle 101.

The position and azimuth of the vehicle being discussed, which have been detected by the present position detecting means 120, and the coordinate deviation of the preceding vehicle with respect to the vehicle being discussed, which has been calculated by the present position/azimuth correcting means 122, are transmitted via the transmitting/receiving means 53, 92 to the following vehicle (If the vehicle being discussed is the following vehicle 102, then the above following vehicle means the following vehicle 103 which runs immediately following the vehicle being discussed).

Figure 7:
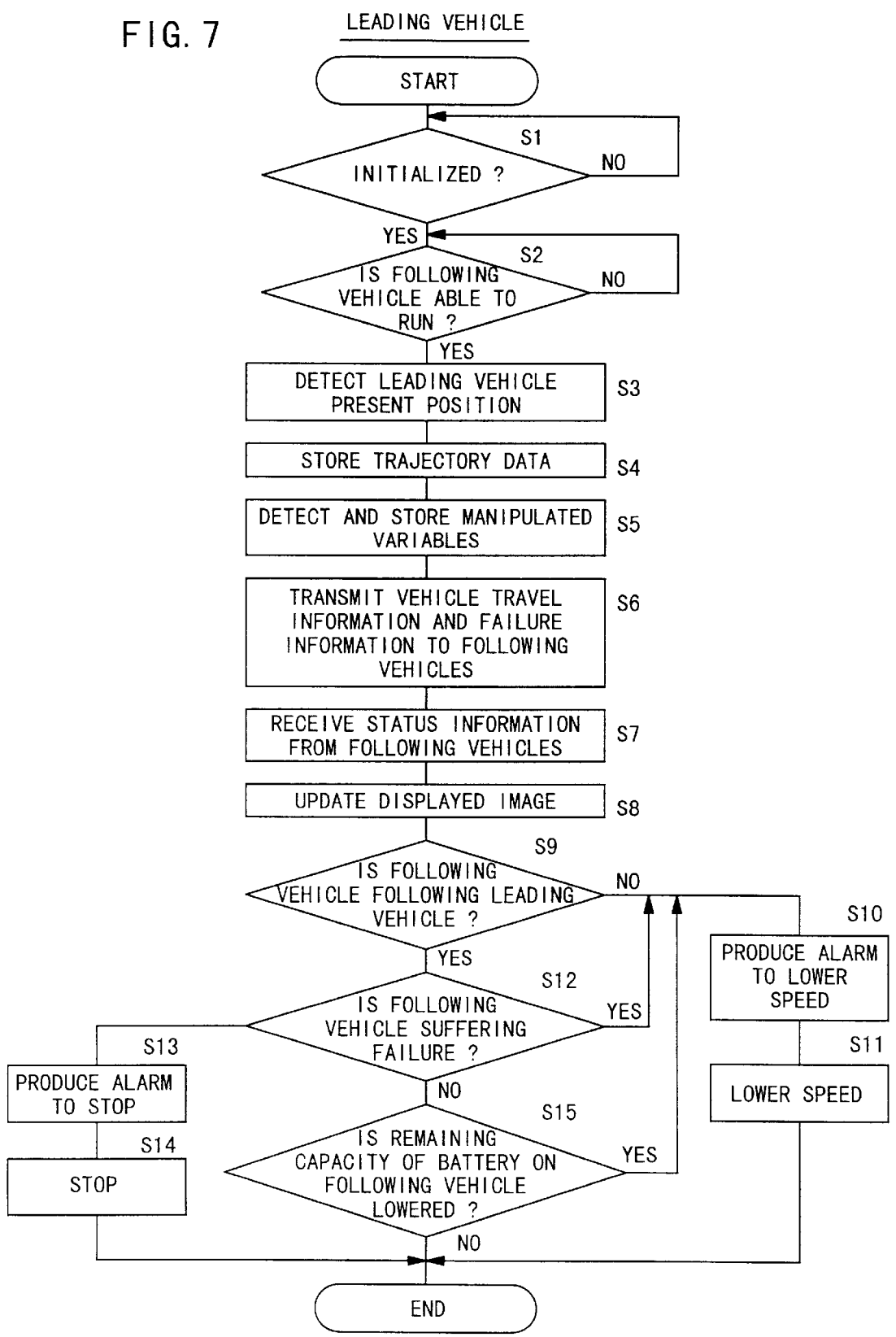
FIG. 7 is a main flowchart of a control sequence of the leading vehicle.

FIG. 7 shows a control sequence carried out by the vehicle travel ECU 60 (see FIG. 5) of the leading vehicle 101 in a platoon.

Figure 8:
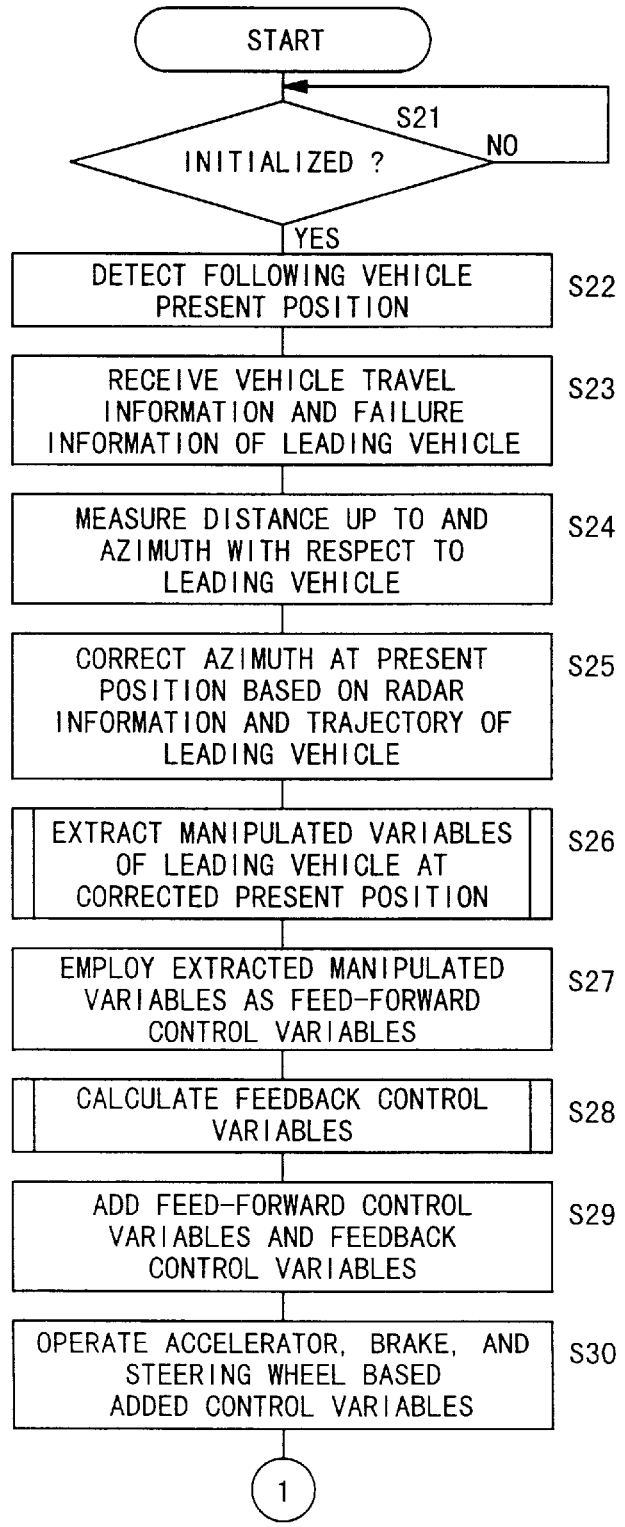
FIGS. 8 and 9 are a main flowchart (1/2, 2/2) of a control sequence of each following vehicle.
Figure 9:
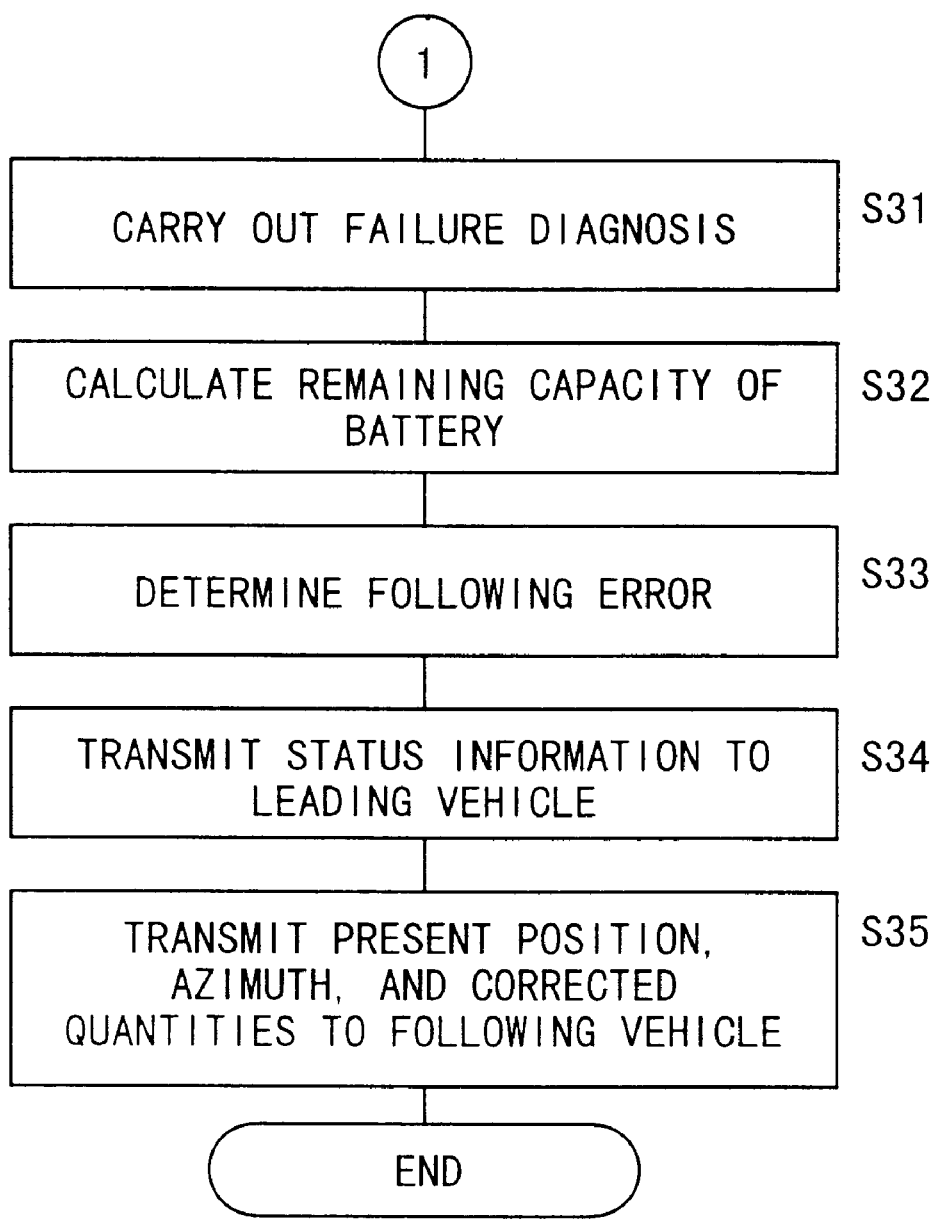

FIGS. 8 and 9 show a control sequence carried out by the vehicle travel ECU 60 (see FIG. 6) of each of the following vehicles 102, 103 in the platoon.

A process of controlling the leading vehicle 101 and the following vehicles 102, 103 when they run in a platoon will be described below with reference to FIGS. 7 through 9.

When the leading vehicle 101 and the following vehicles 102, 103 start to run in a platoon, these vehicles are initialized in steps S1, S21. In such an initializing process, intra-platoon vehicle numbers are determined as ID (identification) numbers for the electric vehicles 10, i.e., the leading vehicle 101 and the following vehicles 102, 103 which are also referred to as vehicles 101, 102, 103, and stored in the intra-platoon vehicle number memory means 116, and coordinates of the electric vehicles 101, 102, 103 whose intra-platoon vehicle numbers have been determined are established.

Figure 10:
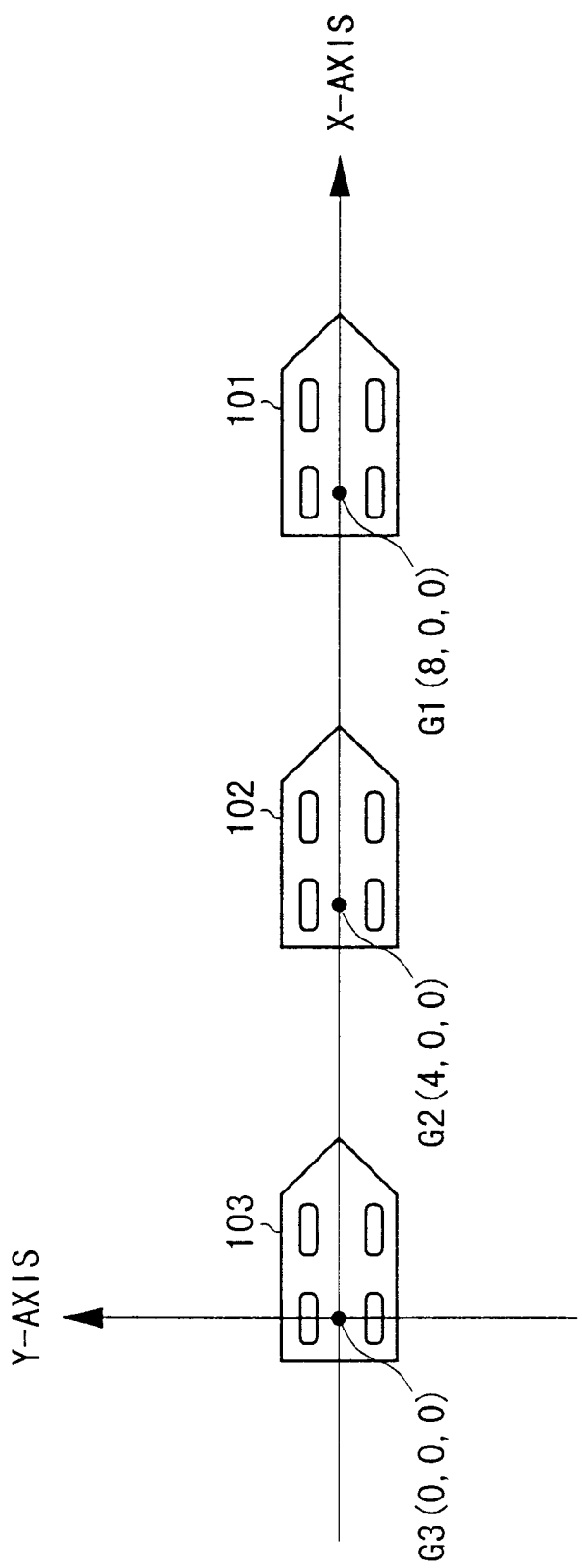
FIG. 10 is a schematic plan view illustrative of the manner in which the positions and coordinates of vehicles are established at the time the vehicles start running in a platoon.

FIG. 10 shows the manner in which coordinates of the electric vehicles 101, 102, 103 are established. In the initializing process, the leading vehicle 101 and the following vehicles 102, 103 are arrayed at intervals of 4 m, for example, on an X-axis along which the leading vehicle 101 and the following vehicles 102, 103 travel. Specifically, the coordinates of the centers of gravity of the leading vehicle 101 and the following vehicles 102, 103 are established as their coordinates. The final following vehicle 103 has coordinates G3 (X, Y, θ) initialized to G3 (0, 0, 0), the following vehicle 102 has coordinates G2 (X, Y, θ) initialized to G2 (4, 0, 0), and the leading vehicle 101 has coordinates G1 (X, Y, θ) initialized to G1 (8, 0, 0). The azimuth θ is represented by a counterclockwise angle from the X-axis. If the direction of travel of a vehicle is turned 90° from the X-axis to the Y-axis in FIG. 10, then the azimuth θ of the vehicle becomes 90°.

In the initializing process, the times of the following vehicles 102, 103 are reset to and synchronized with the time of the vehicle 101. In this embodiment, the time of the leading vehicle 101 is in synchronism with the time of a GPS satellite based on an output signal from the GPS/DGPS position detecting unit 70. However, the time of the leading vehicle 101 may start from zero when the leading vehicle 101 starts moving.

In the initializing process, furthermore, the vehicles 101, 102, 103 are automatically inspected for their starting. Based on the result of the automatic inspection, statuses of various sensors including the steering sensor 80 are transmitted from the following vehicles 102, 103 to the leading vehicle 101.

In response to the transmitted status information, the leading vehicle 101 decides whether the following vehicles 102, 103 are in a normal status or not. If the following vehicles 102, 103 are in a normal status, then as shown in FIG. 4, the driver of the leading vehicle 101 operates the steering wheel, the accelerator pedal, and the brake pedal to drive the leading vehicle 101 to start running in step S2. When the leading vehicle 101 starts running and at constant intervals of time after the leading vehicle 101 starts running, the leading vehicle 101 transmits its own position detected by the GPS/DGPS position detecting unit 70, i.e., the position (latitude, longitude, and time) of the platoon, to the central facility 16. Therefore, the central facility 16 can recognize the present position of the platoon of the vehicles 101, 102, 103, and can accurately estimate the time of arrival at the port 13(B). Because the positional data detected by the GPS/DGPS position detecting unit 70 has an accuracy of about 1 m, the detected positional data are not suitable for use in a vehicle following control process in which the vehicles run at a relatively high speed and are controlled in a real-time fashion, e.g., the vehicles run in a platoon at 40 km/h. at spaced intervals of 1 m.

When the vehicles start to run in a platoon with the following vehicles 102, 103 tracing the trajectory of the leading vehicle 101 and with a distance of 1 m, for example, being kept between a preceding vehicle and a following vehicle, the present position detecting means 91 of the leading vehicle 101 detects the position (present position) and the direction (direction of travel) of the leaving vehicle 101 at every predetermined time interval of 10 ms, for example, from output signals of the distance sensor 72 and the azimuth sensor 74, as present position coordinates G1 (X, Y, θ) in step S3.

The present position coordinates G1 which represent the present position and direction that have been detected are then stored as trajectory data {vehicle position (X, Y) and direction θ} as a collection of the coordinates G1 addressable by times in the memory means 93 in step S4.

The manipulated variable detecting means 94 detects manipulated variables, applied by the driver of the leading vehicle 101, from the accelerator sensor 76, the brake sensor 78, and the steering sensor 80 {a control torque T (Nm) representing a manipulated variable of the motor 44 which corresponds to the accelerator pedal depression, a brake oil pressure P (N/m$^2$) representing a manipulated variable of the vehicle brake pedal, and a steered angle ω (degree) representing a manipulated variable of the steering wheel} at the same time intervals as those at which the coordinates G1 are detected, and stores the detected manipulated variables as a set of manipulated variables (T, P, ω) in the memory means 93 in step S5. The stored data in the memory means 93 make up a vehicle travel information table as described below.

FIG. 11 shows a vehicle travel information table 132 with respect to the leading vehicle 101. In the embodiment, the memory means 93 comprises 3000 ring buffers, and stores times t1, t2, . . . , trajectory data, and manipulated variable data in combinations associated successively with respective addresses No. 1 through No. 3000. For example, at the address No. 1, the trajectory data (position, direction) are stored as trajectory data (position, direction) =(X, Y, θ)=(X1, Y1, θ1), and the manipulated variable data (accelerator pedal, brake pedal, and steering wheel) are stored as manipulated variable data (accelerator pedal, brake pedal, and steering wheel)={T (Nm), P (N/m$^2$), ω (degree)}=(T1, P1, ω1). If the trajectory data and the manipulated variable data have been stored in the vehicle travel information table 132 from the address No. 1 up to the address No. 3000, then new trajectory data and manipulated variable data are stored to overwrite the existing data at the address No. 1. In this manner, the trajectory data and the manipulated variable data are stored in the memory means 93 by way of circulating storage.

In reality, no time information is required in controlling the vehicles which are running in a platoon. Of the trajectory data (X, Y, θ), the positional trajectory data (X, Y) comprise accumulated data ranging from an origin point at an initialized position near the port 13(A) to an ending point at a position near the port 13(B). Specifically, if the distance sensor 72 produces output signals representing distances Ra, Rb and the azimuth sensor 74 produces output signals representing directions θa, θb, for example, respectively at times ta, tb spaced by a time interval of 10 ms, then the trajectory data (X, Y, θ) at the time ta are represented by (X, Y, θ)=(Ra×cos θa, Ra×sin θa, θa), and the trajectory data (X, Y, θ) at the time tb are represented by (X, Y, θ)=(Ra×cos θa+(Rb−Ra)cos θb, Ra×sin θa+(Rb−Ra)sin θb, θb).

The vehicle travel information table 132 stored in the memory means 93 of the leading vehicle 101 is transmitted as vehicle travel information of the leading vehicle, together with failure information, e.g., information indicating that the control torque, the brake oil pressure, or the steered angle falls out of a given range, to the following vehicles 102, 103 at predetermined time intervals in a real-time fashion in step S6.

In each of the following vehicles 102, 103, the present position detecting means 120 detects its position (X, Y) and its direction θ at time intervals of 10 ms based on output signals from the distance sensor 72 and the azimuth sensor 74, and stores the detected position and direction in the memory means 93 which comprises 3000 ring buffers in step S22.

Then, in each of the following vehicles 102, 103, the transmission/reception means 53, 92 receives the vehicle travel information and failure information of the leading vehicle 101, which have been transmitted from the leading vehicle 101 in step S6, in step S23.

In each of the following vehicles 102, 103, the laser radar 50 and the distance/azimuth measuring means 124 measure a distance up to and an azimuth (radar information) with respect to a preceding vehicle (which is the leading vehicle 101 for the following vehicle 102 and the following vehicle 102 for the following vehicle 103) in step S24.

Then, each of the following vehicles 102, 103 corrects its own present position and azimuth based on the radar information and the trajectory of the leading vehicle 101 in step S25. Details of the processing in step S25 will be described below.

Basically, the trajectory of a vehicle is determined from an integral of an output signal from the distance sensor 72 (which may be an integral of an output signal from the vehicle speed sensor) or an output signal from the azimuth sensor 74 (which may be a differential of an output signal from the yaw rate sensor). If the vehicle and other vehicles run in a platoon, then trajectories of the other vehicles can be obtained by way of vehicle-to-vehicle communications. Therefore, the accelerator pedal, the brake pedal, and the steering wheel of the vehicle may be controlled in order to equalize the trajectory thereof to the trajectories of the other vehicles. However, even if the vehicles are of the same type, their coordinate systems are caused to deviate gradually from each other due to different road conditions, running performance differences, sensor errors, etc. Therefore, even if the process of controlling the trajectory of a following vehicle into accord with the trajectory of a preceding vehicle is highly accurate, the actual trajectory of the following vehicle tends to deviate from the trajectory of the preceding vehicle owing to the coordinate system deviation. To solve this problem, the coordinate system deviations may be calculated from the trajectory information of the preceding vehicle obtained by way of vehicle-to-vehicle communications and the radar information of the following vehicle, and the trajectory (positional) information of the following vehicle may be corrected on the basis of the calculated coordinate system deviations for thereby controlling all the vehicles to run in one coordinate system.

Figure 12:
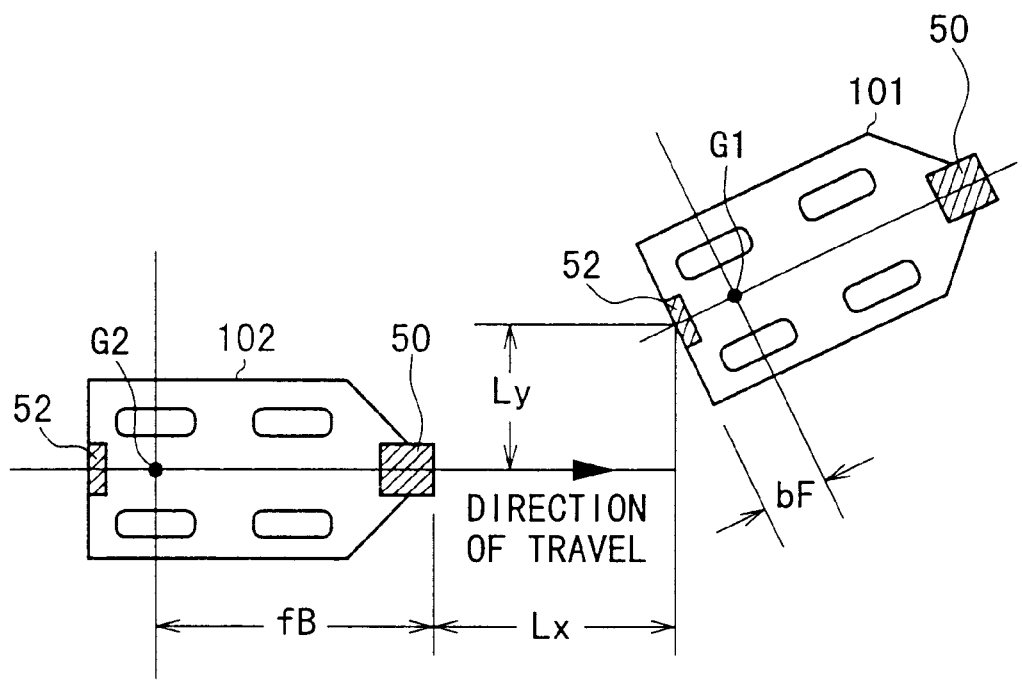
FIG. 12 is a schematic plan view illustrative of the relationship between a laser radar on a following vehicle and a radar measurement point on a leading vehicle.
Figure 13:
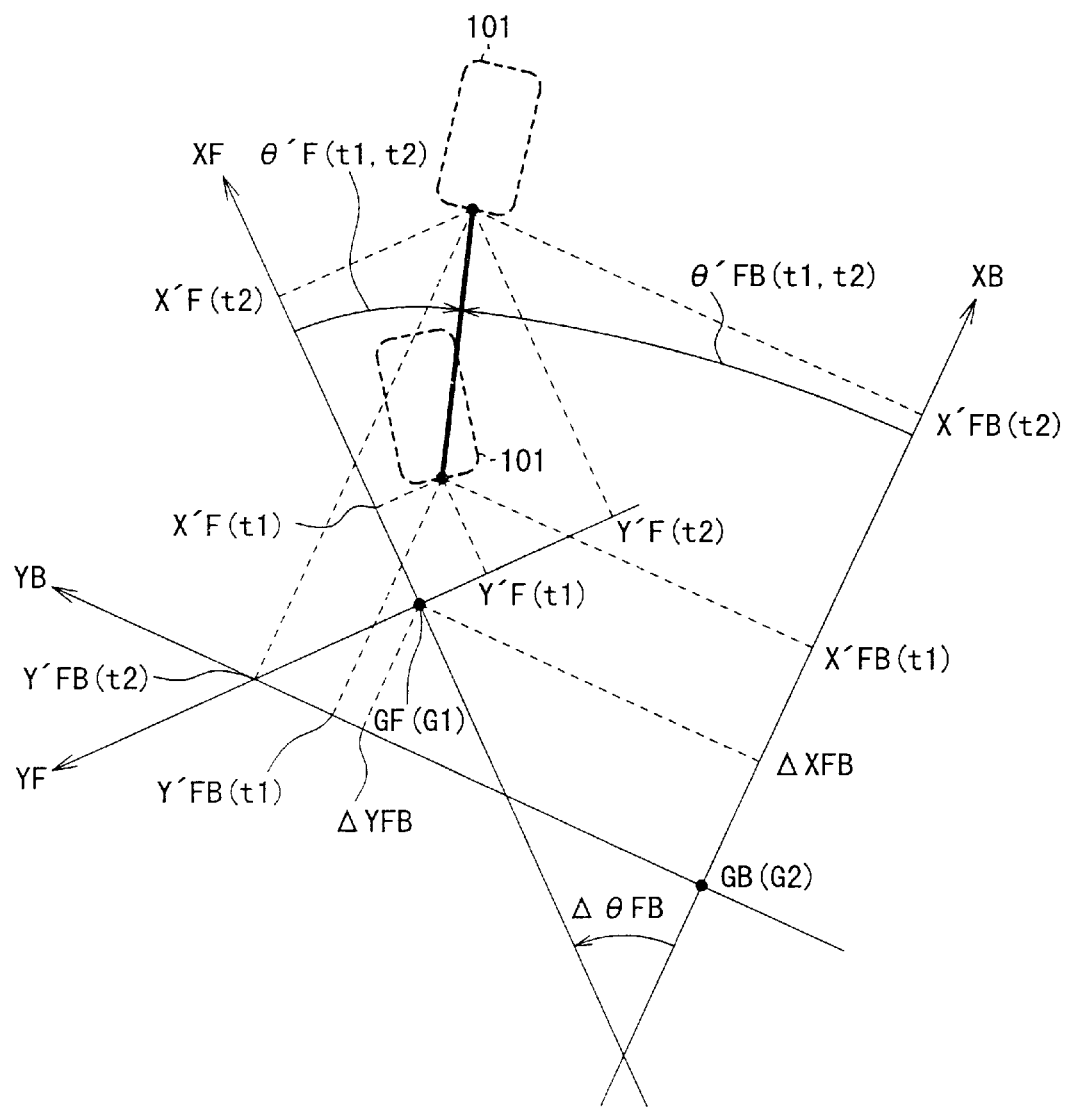
FIG. 13 is a diagram illustrative of coordinate deviations of the following vehicle.

Various symbols used to determine coordinate system deviations are defined as follows:

GF: coordinate system of a preceding vehicle;
GB: coordinate system of a following vehicle;
XF(t1): X coordinate of the preceding vehicle at a time t1 (e.g., position X1 of the trajectory data at the address No. 1 in the vehicle travel information table 132 shown in FIG. 11);
YF(t1): Y coordinate of the preceding vehicle at the time t1 (e.g., position Y1 of the trajectory data at the address No. 1 in the vehicle travel information table 132 shown in FIG. 11);
θF(t1): yaw angle of the preceding vehicle at the time t1 (e.g., direction θ1 of the trajectory data at the address No. 1 in the vehicle travel information table 132 shown in FIG. 11);
XB(t1): X coordinate of the following vehicle at the time t1;
YB(t1): Y coordinate of the following vehicle at the time t1;
θB(t1): yaw angle of the following vehicle at the time t1;
Symbols will be described below with reference to FIG. 12.
fB: distance from the center of gravity G2 of the following vehicle to the position where the laser radar 50 is installed;
bF: distance from the center of gravity G1 of the preceding vehicle to the reflector 52 which is a radar measurement point;
Lx(t1): component of the distance between the laser radar 50 and the reflector 52 at the time t1 as viewed from the following vehicle 102 in the direction of travel (radar information);
Ly(t1): lateral component of the distance between the laser radar 50 and the reflector 52 at the time t1 as viewed from the following vehicle 102 in a direction perpendicular to the direction of travel (radar information);
Symbols will be described below with reference to FIG. 13.
ΔXFB: X coordinate of the origin of the GF coordinate system as viewed from the GB coordinate system (coordinate deviation);
ΔYFB: Y coordinate of the origin of the GF coordinate system as viewed from the GB coordinate system (coordinate deviation);
ΔθFB: angle of rotation of the GF coordinate system as viewed from the GB coordinate system (coordinate deviation);

A process of calculating the coordinate deviations ΔXFB, ΔYFB, and ΔθFB in accordance with the above definition of the symbols will be described below.

Coordinates {X'F(t1), Y'F(t1)} in the GF coordinate system of the radar measurement point (reflector 52) at the time t1 are expressed by the following equations (1), (2):

$$X'F(t1)=XF(t1)-bF\times\cos\theta F(t1) \quad (1)$$

$$Y'F(t1)=YF(t1)-bF\times\sin\theta F(t1) \quad (2)$$

Coordinates {X'FB(t1), Y'FB(t1)} in the GB coordinate system of the radar measurement point at the time t1 are expressed by the following equations (3), (4):

$$X'FB(t1)=XB(t1)+\{LX(t1)+fB\}\times\cos\theta B(t1)+LY(t1)\times\sin\theta B(t1) \quad (3)$$

$$Y'FB(t1)=YB(t1)-\{LX(t1)+fB\}\times\sin\theta B(t1)+LY(t1)\times\cos\theta B(t1) \quad (4)$$

Similarly, when the preceding vehicle moves from the position at the time t1 to the position at the time t2, the coordinates are calculated according to the following equations (5) through (8):

$$X'F(t2)=XF(t2)-bF\times\cos\theta F(t2) \quad (5)$$

$$Y'F(t2)=YF(t2)-bF\times\sin\theta F(t2) \quad (6)$$

$$X'FB(t2)=XB(t2)+\{LX(t2)+fB\}\times\cos\theta B(t2)+LY(t2)\times\sin\theta B(t2) \quad (7)$$

$$Y'FB(t2)=YB(t2)-\{LX(t2)+fB\}\times\sin\theta B(t2)+LY(t2)\times\cos\theta B(t2) \quad (8)$$

From the above coordinate data of four sets {the equations (1), (2), the equations (3), (4), the equations (5), (6), and the equations (7), (8)} at the two times t1, t2, coordinate deviations (ΔXFB, ΔYFB, and ΔθFB) are calculated.

An angle θ'F(t1, t2) formed between the XF axis and a straight line interconnecting the coordinate point {X'F(t1), Y'F(t1)} and the coordinate point {X'F(t2), Y'F(t2)} in the GF coordinate system is calculated according to the following equation (9):

$$\theta'F(t1, t2)=\arctan[\{X'F(t2)-X'F(t1)\}/\{Y'F(t2)-Y'F(t1)\}] \quad (9)$$

Similarly, an angle θ'FB(t1, t2) formed between the XB axis and a straight line interconnecting the coordinate point {X'FB(t1), Y'FB(t1)} and the coordinate point {X'FB(t2), Y'FB(t2)} in the GB coordinate system is calculated according to the following equation (10):

$$\theta'FB(t1, t2)=\arctan[\{X'FB(t2)-X'FB(t1)\}/\{Y'FB(t2)-Y'FB(t1)\}] \quad (10)$$

Since the straight lines in the above coordinate systems are identical to each other, the coordinate deviation ΔθFB between the GF coordinate system and the GB coordinate system is determined according to the following equation (11):

$$\Delta\theta FB = \theta' FB(t1, t2) - \theta' F(t1, t2) \qquad (11)$$

The coordinate deviation ΔXFB in the X direction and the coordinate deviation ΔYFB in the Y direction are calculated from the information at the time t2 by the following equations (12), (13):

$$\Delta XFB = X'FB(t2) - X'F(t2) \times \cos \Delta\theta FB - Y'F(t2) \times \sin \Delta\theta FB \qquad (12)$$

$$\Delta YFB = Y'FB(t2) + X'F(t2) \times \sin \Delta\theta FB - Y'F(t2) \times \cos \Delta\theta FB \qquad (13)$$

The GF coordinate system and the GB coordinate system are fixed regardless of motion of the vehicles, and any coordinate deviations are small even when the vehicles move a certain distance. Therefore, the coordinate deviations (ΔXFB, ΔYFB, and ΔθFB) may be calculated less frequently than the control period of 10 ms and is not required to be in synchronism with the control period of 10 ms. In this embodiment, the coordinate deviations (ΔXFB, ΔYFB, and ΔθFB) are calculated in every 140 ms.

Using the coordinate deviations (ΔXFB, ΔYFB, and ΔθFB) thus calculated, the position and direction of the preceding vehicle as viewed from the following vehicle at any arbitrary time t can be calculated according to the following equations (14) through (16):

$$XFB(t) = \Delta XFB + XF(t) \times \cos \Delta\theta FB + YF(t) \times \sin \Delta\theta FB \qquad (14)$$

$$YFB(t) = \Delta YFB - XF(t) \times \sin \Delta\theta FB + YF(t) \times \cos \Delta\theta FB \qquad (15)$$

$$\theta FB = \Delta\theta FB - \theta F(t) \qquad (16)$$

Conversely, if the position of the following vehicle is to be corrected in conformity with the trajectory of the preceding vehicle, then the corrected coordinates (corrected position) of the following vehicle can be calculated according to the following equations (17) through (19):

$$XBS(t) = XB(t) \times \cos(-\Delta\theta FB) - YB(t) \times \sin(-\Delta\theta FB) - \Delta XFB \qquad (17)$$

$$YBS(t) = XB(t) \times \sin(-\Delta\theta FB) + YB(t) \times \cos(-\Delta\theta FB) - \Delta YFB \qquad (18)$$

$$\theta BS(t) = \theta B(t) - \Delta\theta FB \qquad (19)$$

Now, a process of calculating coordinate deviations when three or more vehicles run in a platoon will be described below. For an easier understanding, the leading vehicle 101 will be referred to as a first vehicle, the following vehicle 102 as a second vehicle, and the following vehicle 103 as a third vehicle.

First, trajectory information {X1(t), Y1(t), θ1(t)} of the first vehicle in a G1 coordinate system thereof is sent to the second vehicle. Sin the information is broadcast, the third vehicle and fourth and fifth vehicles, if any, can simultaneously receive the transmitted information.

Secondly, from the received trajectory information {X1(t), Y1(t), θ1(t)}, measured trajectory information {X2(t), Y2(t), θ2(t)} of the second vehicle in a G2 coordinate system thereof, and radar information obtained by measuring the first vehicle from the second vehicle, the second vehicle calculates coordinate deviations (ΔX12, ΔY12, Δθ12) between the G2 coordinate system and the G1 coordinate system, and corrects the position of the second vehicle.

Thirdly, the second vehicle transmits its own position {X2(t), Y2(t), θ2(t)} on the trajectory in the G2 coordinate system and the coordinate deviations (ΔX12, ΔY12, Δθ12) between the G2 coordinate system and the G1 coordinate system to the third vehicle.

Fourthly, from the received trajectory information {X2(t), Y2(t), θ2(t)} of the second vehicle, measured trajectory information {X3(t), Y3(t), θ3(t)} of the third vehicle in a G3 coordinate system thereof, and radar information obtained by measuring the second vehicle from the third vehicle, the third vehicle calculates coordinate deviations (ΔX23, ΔY23, Δθ23) between the G3 coordinate system and the G2 coordinate system.

Fifthly, coordinate deviations (ΔX13, ΔY13, Δθ13) of the G1 coordinate system as viewed from the G3 coordinate system are calculated from the coordinate deviations (ΔX12, ΔY12, Δθ12) between the G2 coordinate system and the G1 coordinate system, and coordinate deviations (ΔX23, ΔY23, Δθ23) between the G3 coordinate system and the G2 coordinate system.

Figure 14:
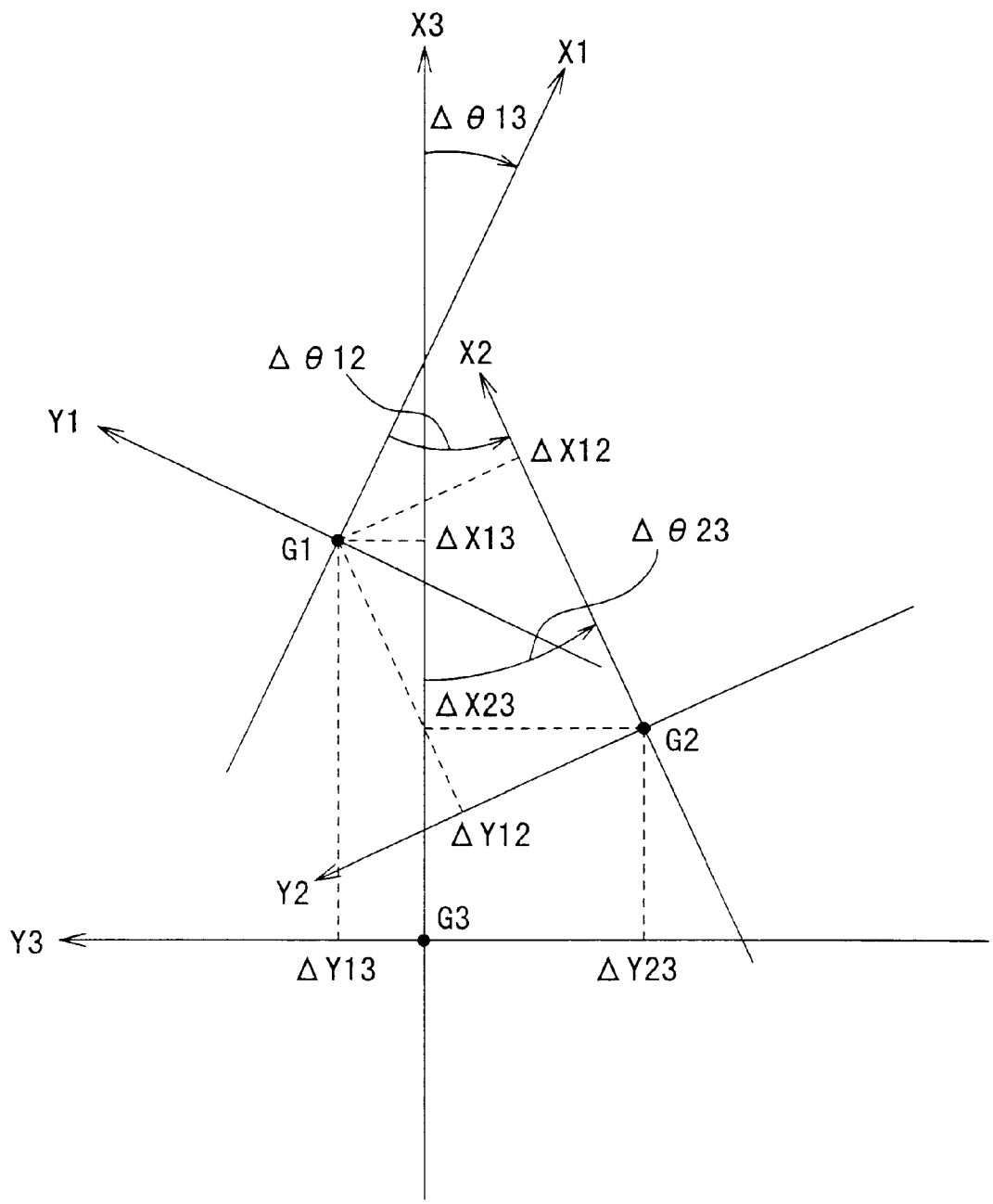
FIG. 14 is a diagram illustrative of a processing of adding the coordinate deviations of the following vehicle.

FIG. 14 is illustrative of the process of calculating the above coordinate deviations. The coordinate deviations (ΔX13, ΔY13, Δθ13) of the G1 coordinate system as viewed from the G3 coordinate system are calculated according to the following equations (20) through (22):

$$\Delta X13 = \Delta X23 + \Delta X12 \times \cos \Delta\theta 12 + \Delta Y12 \times \sin \Delta\theta 12 \qquad (20)$$

$$\Delta Y13 = \Delta Y23 - \Delta X12 \times \sin \Delta\theta 12 + \Delta Y12 \times \cos \Delta\theta 12 \qquad (21)$$

$$\Delta\theta 13 = \Delta\theta 23 + \Delta\theta 12 \qquad (22)$$

Sixthly, the third vehicle can calculate an accurate first vehicle trajectory from the trajectory information {X1(t), Y1(t), θ1(t)} of the first vehicle in the G1 coordinate system and the coordinate deviations (ΔX13, ΔY13, Δθ13) of the G1 coordinate system as viewed from the G3 coordinate system, and can correct its own position.

Finally, coordinate deviations can similarly be calculated when four or more vehicles run in a platoon.

The process of correcting the position and azimuth of each of the following vehicles 102, 103 in step S25 is now completed.

Then, in each of the following vehicles 102, 103, based on the corrected present position thereof, the feed-forward control variable calculating means 112 extracts manipulated variables, to be selected, of the leading vehicle 101 at the corrected present position in step S26.

Figure 15:
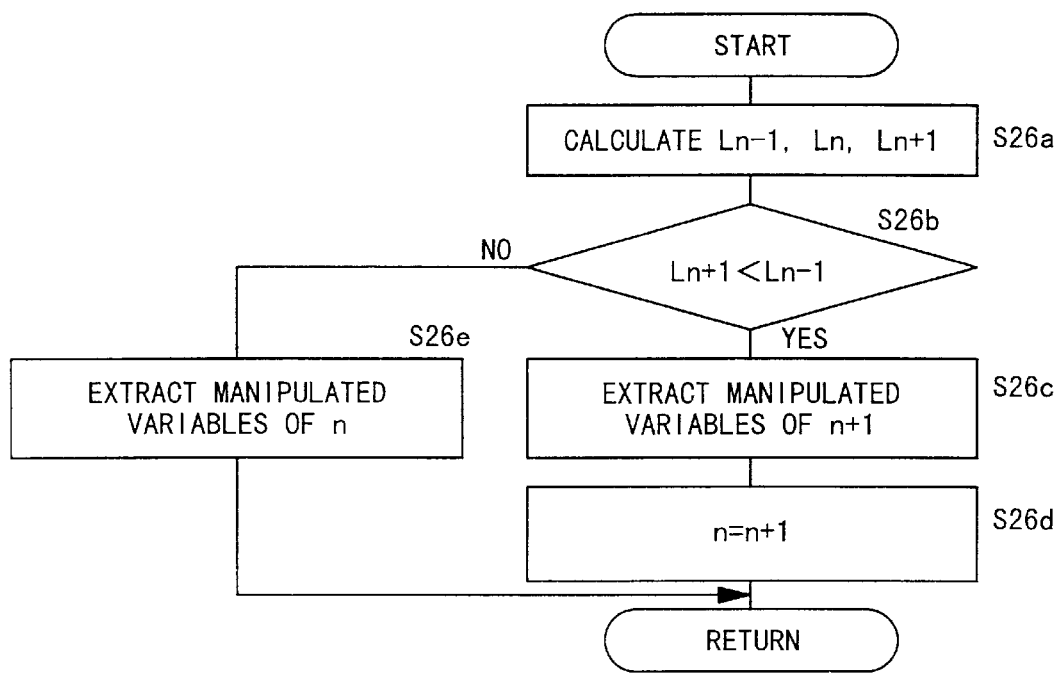
FIG. 15 is a flowchart of a process of extracting manipulated variables.

FIG. 15 shows a process of extracting manipulated variables.

Figure 16:
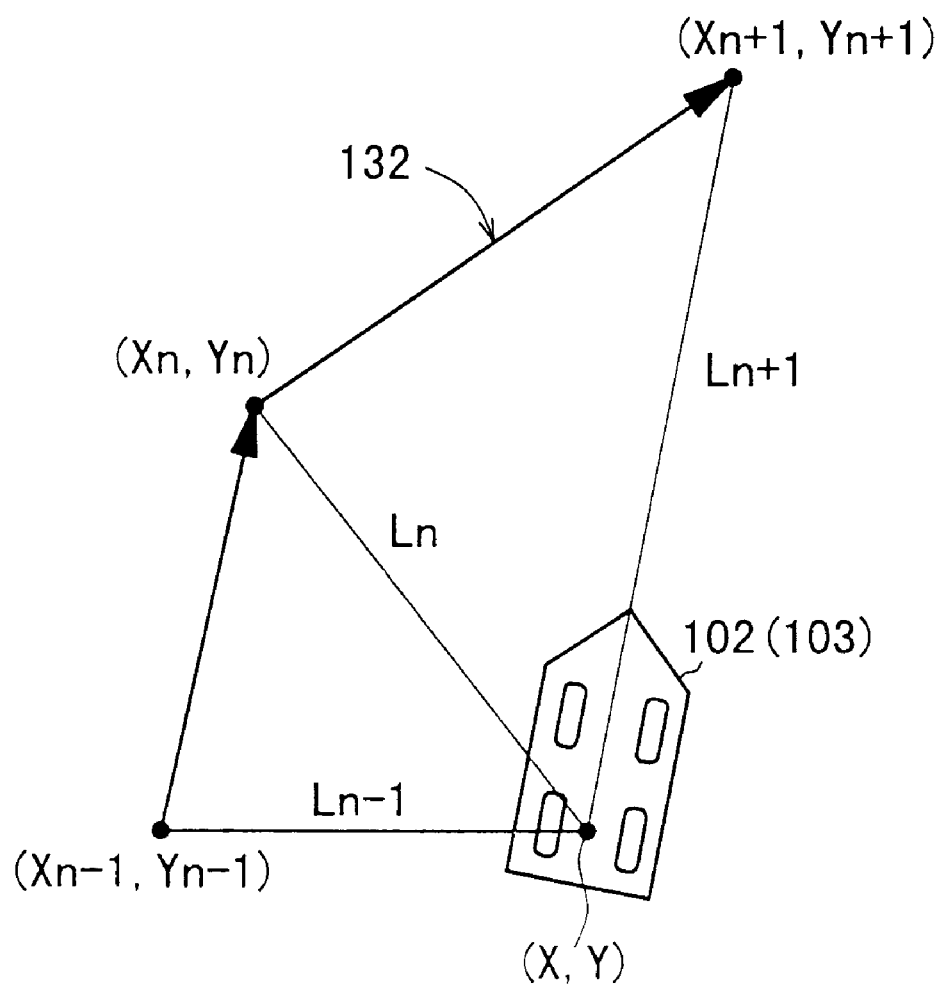
FIG. 16 is a schematic plan view illustrative of the process of extracting manipulated variables.

FIG. 16 shows in plan the corrected present position of the following vehicle 102, where XBS(t) in the equation (17) is replaced with X and YBS(t) in the equation (18) is replaced with Y, indicating that the following vehicle 102 is present at coordinates (X, Y). Vectors in FIG. 16 are a schematic representation of the vehicle travel information table 132 relative to the trajectory of the leading vehicle 101. Trajectory data (Xn−1, Yn−1), (Xn, Yn), (Xn+1, Yn+1) are associated with respective manipulated variable data (Tn−1, Pn−1, ωn−1), (Tn, Pn, ωn), (Tn+1, Pn+1, ωn+1) (see FIG. 11).

While the following vehicle 102 is running with the manipulated variable data (Tn, Pn, ωn) associated with the trajectory data (Xn, Yn), distances Ln−1, Ln, Ln+1 between the corrected present position (X, Y) and the trajectory coordinates (Xn−1, Yn−1), (Xn, Yn), (Xn+1, Yn+1) of the leading vehicle 101 are calculated according to the following equations (23) through (25) in step S26a. Specifically, a distance Ln between the corrected present position (X, Y) and the trajectory position (Xn, Yn) employing the present manipulated variable data, and distances Ln−1, Ln+1 to the trajectory positions (Xn−1, Yn−1), (Xn+1, Yn+1) are calculated.

$$Ln-1=\{(Xn-1-X)^2+(Yn-1-Y)^2\}^{1/2} \quad (23)$$

$$Ln=\{(Xn-X)^2+(Yn-Y)^2\}^{1/2} \quad (24)$$

$$Ln+1=\{(Xn+1-X)^2+(Yn+1-Y)^2\}^{1/2} \quad (25)$$

Then, the following inequality (26) is calculated in step S26b.

$$(Ln+1+Ln)<(Ln+Ln-1) \quad (26)$$

It is decided whether the inequality (26) is satisfied or not. If satisfied, i.e., if the next distance Ln+1 is shorter than the preceding distance Ln−1, then new manipulated variable data (Tn+1, Pn+1, ωn+1) which are an (n+1)th data set in the trajectory position (Xn+1, Yn+1) are employed as present manipulate variables (feed-forward controlled variables calculated by the feed-forward control variable calculating means 112) in step S26c.

Then, the parameter n is updated to n+1 in step S26d.

If the inequality (26) is not satisfied, i.e., if the preceding distance Ln−1 is shorter than the next distance Ln+1, then the presently employed manipulated variable data (Tn, Pn, ωn) in the trajectory position (Xn, Yn) are employed as present manipulate variables (feed-forward controlled variables) in step S26e. In this manner, since the following vehicle 102 is controlled to trace the trajectory positions of the leading vehicle 101 one by one based on the corrected present position (X, Y), no time information is needed to control the following vehicle 102 to follow the leading vehicle 101.

The extracted manipulated variable data are directly employed as feed-forward control variables, and supplied to one input terminal of the adding means 126 in step S27.

Then, the feedback control variable calculating means 118 calculates feedback control variables to eliminate the difference between the trajectory (Xn, Yn) of the leading vehicle 101 and the corrected present position (X, Y), i.e., the distance L, in step S28.

Figure 17:
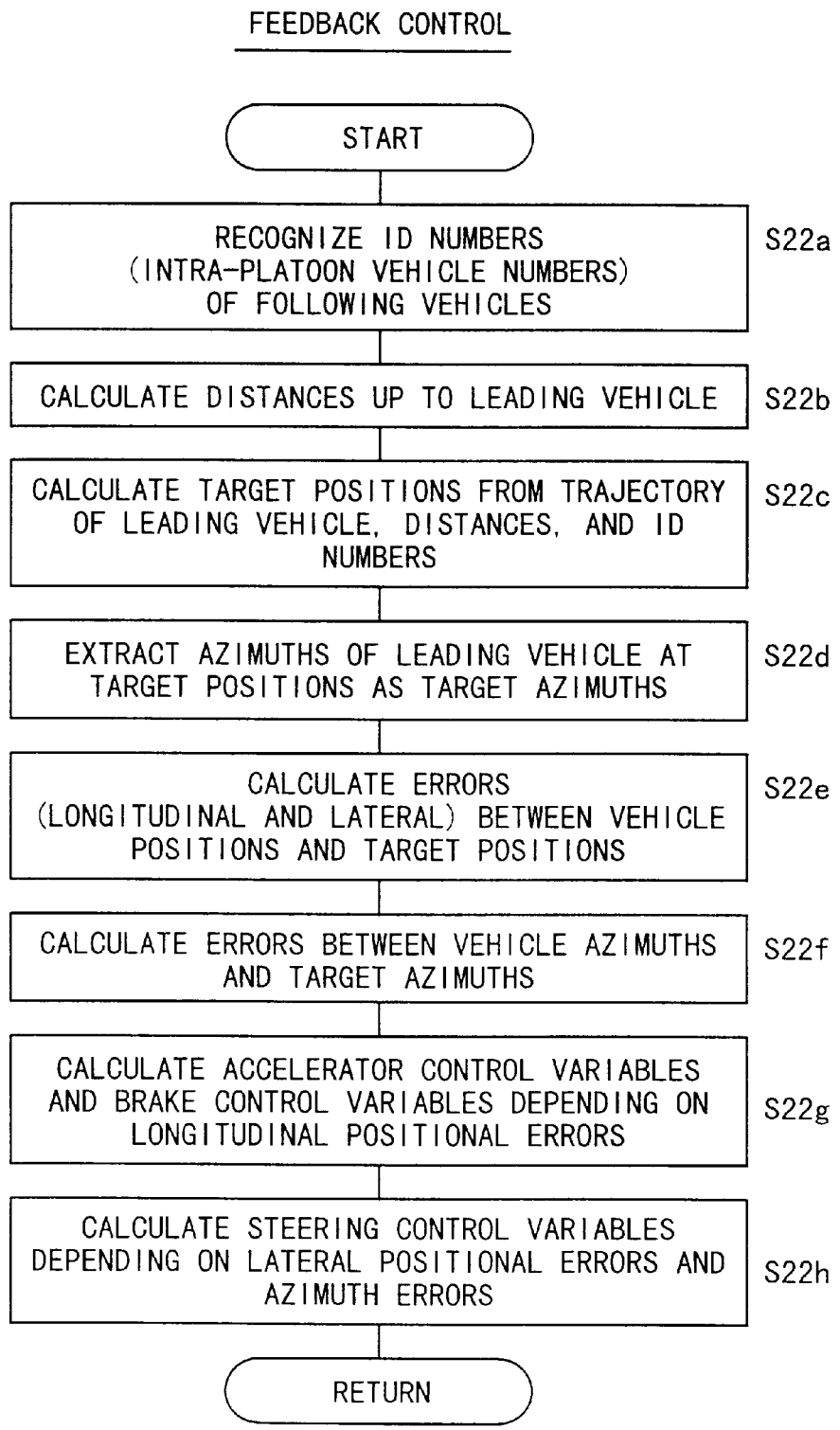
FIG. 17 is a flowchart of a control sequence of a feedback control process.
Figure 18:
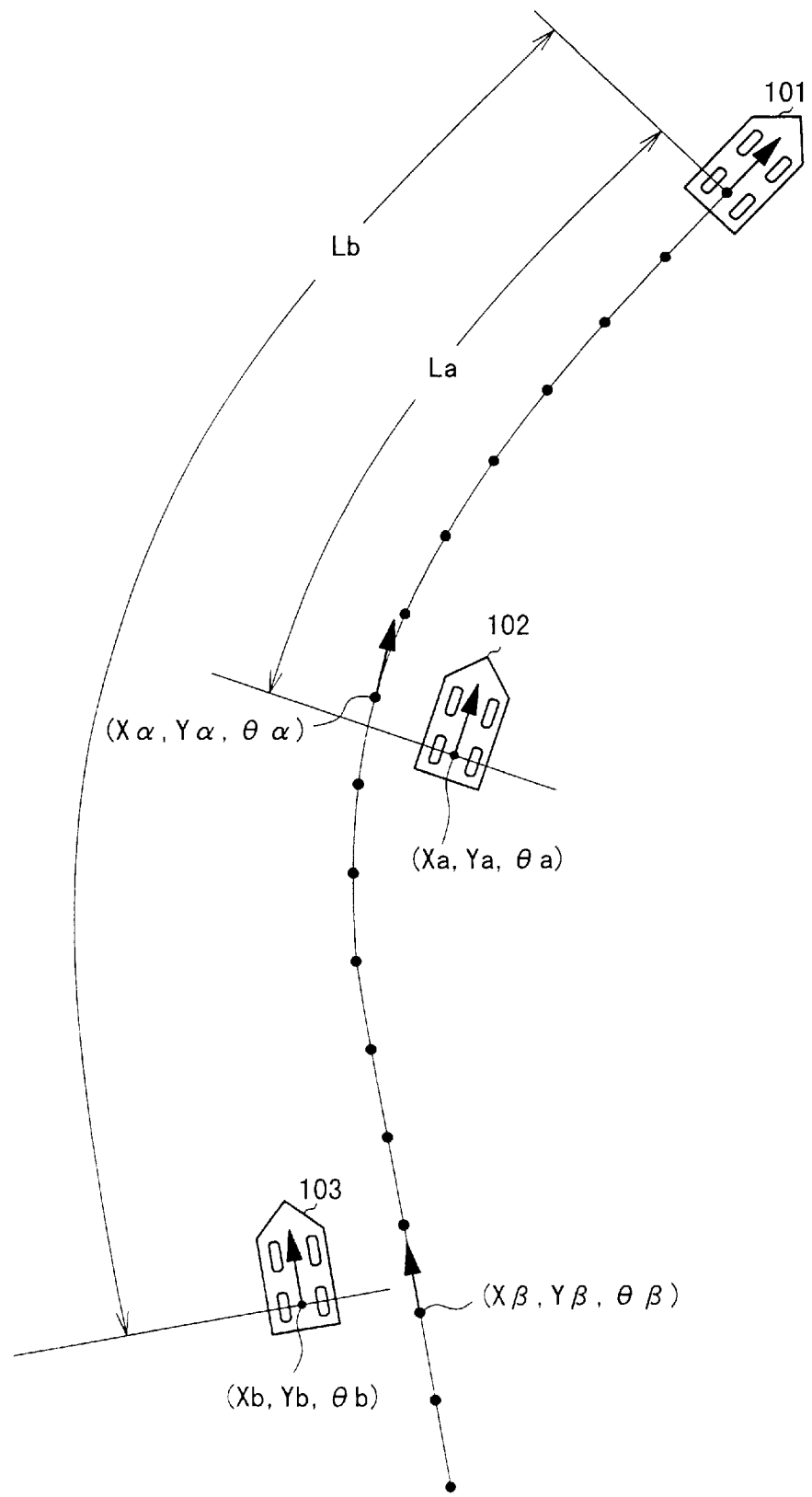
FIG. 18 is a schematic plan view illustrative of the feedback control process.

FIG. 17 shows a control sequence of a feedback control process, and FIG. 18 is illustrative of the feedback control process.

The following vehicles 102, 103 recognize their own identification numbers (intra-platoon vehicle numbers) from the data stored in the intra-platoon vehicle number memory means 116 in step S28a.

Then, the following vehicles 102, 103 determine respective distances La, Lb up to the leading vehicle 101 from output signals from the respective distance sensors 72 in step S28b. The distances La, Lb may alternatively be determined by integrating the vehicle speed of the leading vehicle 101.

Referring to the trajectory of the leading vehicle 101, trajectory positions closest to positions that are spaced from the leading vehicle 101 by the distances La, Lb are determined, and established as target positions (Xα, Yα), (Xβ, Yβ) for the respective following vehicles 102, 103 that are identified by their identification numbers, in step S28c. The target positions (Xα, Yα), (Xβ, Yβ) are the same as a target position (Xn, Yn) shown in FIG. 16.

Azimuths of the leading vehicle 101 at the target positions (Xα, Yα), (Xβ, Yβ) are established as respective target azimuths θα, θβ in step S28d.

An error Δe (ΔX, ΔY) between the target positions (Xα, Yα), (Xβ, Yβ) and the present positions (Xa, Ya), (Xb, Yb) is calculated in step S28e. The error Δe is calculated as Δe102 (ΔX, ΔY)={Xα−Xa, Yα−Ya} for the following vehicle 102 and Δe103 (ΔX, ΔY)={Xβ−Xb, Yβ−Yb} for the following vehicle 103.

Likewise, an error Δθ between the azimuths θa, θb of the following vehicles 102, 103 and the target azimuths θα, θβ is calculated in step S28f. The error Δθ is calculated as Δθ102=θα−θa for the following vehicle 102 and Δθ103=θβ−θb for the following vehicle 103.

Then, an accelerator control variable and a brake control variable are calculated on the basis of a longitudinal positional error ΔX between the target positions and the present positions in step S28g. The accelerator control variable is calculated as a function f1 (ΔX) of the error ΔX and the brake control variable is calculated as a function f2 (ΔX) of the error ΔX, individually in the following vehicles 102, 103.

A steering control variable is calculated on the basis of the lateral positional error ΔY and the azimuth error Δθ in step S28h. The steering control variable is calculated as a function g1 (ΔY, Δθ) of the lateral positional error ΔY and the azimuth error Δθ, individually in the following vehicles 102, 103.

The calculated feedback control variables {the accelerator control variable f1 (ΔX), the brake control variable f2 (ΔX), and the steering control variable g1 (ΔY, Δθ)} are supplied to the other input terminal of the adding means 126.

The adding means 126 weights and adds the feed-forward control variables generated in step S27 and the feedback control variables, thereby generating added control variables (an accelerator control variable, a brake control variable, and a steering control variable) in step S29.

Of the added control variables, the accelerator control variable is supplied to the drive power control ECU 42 to energize the motor 44, the brake control variable is supplied to the brake force control ECU 84 to operate the brake actuator 86, and the steering control variable is supplied to the steering ECU 88 to operate the steering actuator 90. In this manner, the accelerator, the brake, and the steering wheel of each of the following vehicles 102, 103 are automatically controlled in step S30.

Then, each of the following vehicles 102, 103 carries out a failure diagnosis on itself, e.g., on the motor 44, the brake actuator 86, and the steering actuator 90, and holds diagnostic data as a failure code in step S31.

Then, each of the following vehicles 102, 103 detects a remaining capacity of the battery 40, and holds the detected remaining capacity as a numerical value in the range from 0 to 100% in step S32. The remaining capacity of the battery 40 can be determined as a value in percentage that is produced when an integrated value of discharged currents is subtracted from a fully charged amount of electric energy in the battery 40.

Each of the following vehicles 102, 103 determines following errors, i.e., decides whether the distance ΔX up to a preceding vehicle as measured by the radar 50 and a lateral error or deviation ΔY fall in a predetermined distance and a predetermined error, respectively, and holds the results in step S33.

Each of the following vehicles 102, 103 transmits the failure code, the remaining capacity of the battery, and the determined following errors to the leading vehicle 101 in step S34.

The following vehicle 102 also transmits the present position, azimuth, and corrected quantities to the following vehicle 103 in step S35. Thereafter, the control sequence shown in FIGS. 8 and 9 is repeated from step S21.

The leading vehicle 101 receives the status information which has been transmitted from the following vehicles 102, 103 in step S34, in step S7 shown in FIG. 7.

Based on the received status information, the leading vehicle 101 updates image information displayed on the display unit 82 in step S8.

Figure 19:
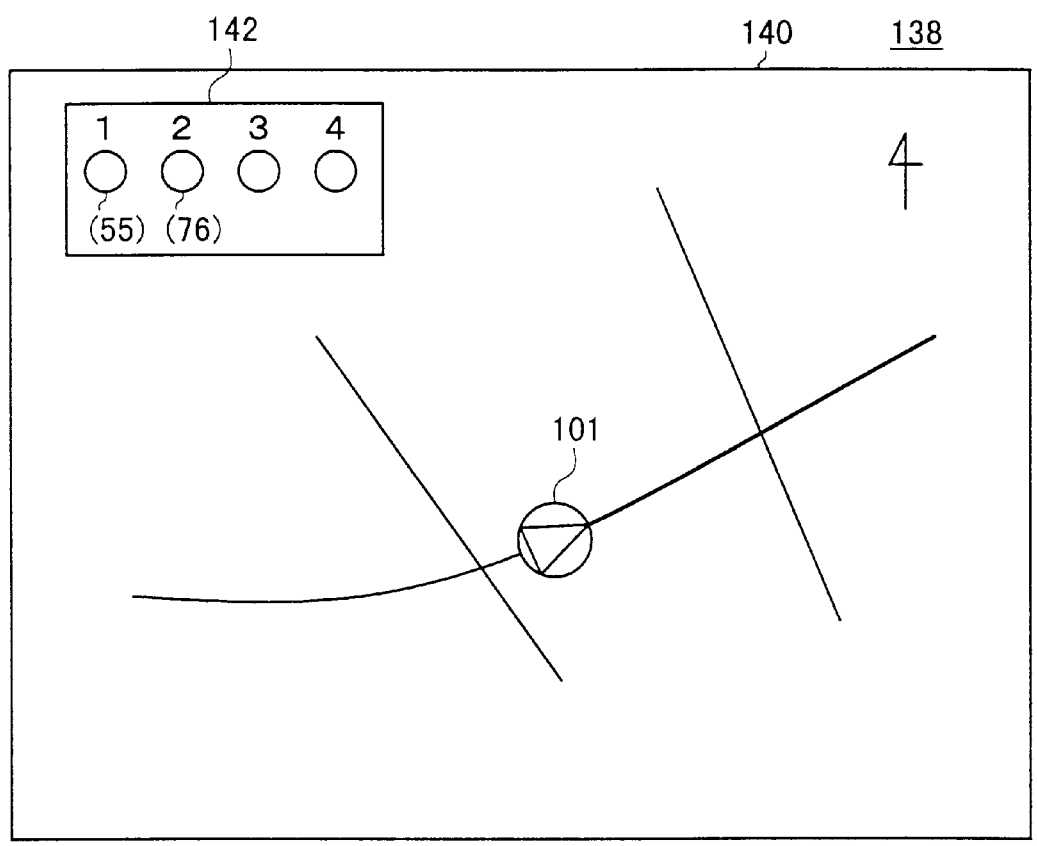
FIG. 19 is a diagram illustrative of a displayed image in relation to vehicles running in a platoon.

FIG. 19 shows a displayed image 140 on the display unit 82 of the navigation system on the leading vehicle 101, the displayed image 140 containing a status display area 142 capable of displaying the statuses of four following vehicles 1, 2, 3, 4. In the status display area 142, circular marks positioned respectively below the numbers of the following vehicles 1, 2, 3, 4 can be displayed in different colors. Specifically, when the circular mark below a following vehicle is displayed in green, it indicates that the following vehicle is running normally, and when the circular mark below a following vehicle is displayed in yellow, it indicates that the following vehicle is suffering a following error greater than a given level. If a following error occurs, then the speaker 81 produces a voice alarm such as "A following error has occurred in a following vehicle. Slow down. Slow down."

When the circular mark below a following vehicle is displayed in red, it indicates that the following vehicle is suffering a malfunction. At this time, the speaker 81 produces a voice alarm such as "A malfunction has occurred in the following vehicle No . . . Stop. Stop."

When the circular mark below a following vehicle is displayed in gray, it indicates that no such following vehicle is present.

Numerical values in parentheses below the colored circular marks, e.g., (55), (76) in FIG. 19, represent remaining capacities in percentage of the batteries on the following vehicles, e.g., the following vehicles 1, 2 in FIG. 19. The fully charged capacity of the battery would be represented by (100).

In the displayed image 140 shown in FIG. 19, the position of only the leading vehicle 101 is illustrated on a map. However, the positions of the following vehicles 1, 2, 3, 4 may also be displayed together with the leading vehicle 101 on the map.

Based on the status information received in step S7, the leading vehicle 101 decides whether a following vehicle is following the leading vehicle 101 at a predetermined distance or not in step S9. If the following vehicle is suffering a following error such as a following delay, then the leading vehicle 101 produces a slow-down alarm in step S10, prompting the driver of the leading vehicle 101 to slow down. The driver then lowers the speed of the leading vehicle 101 in step S11. At this time, the decelerating means 42, 44, 84, 86 (see FIG. 5), which functions as a speed limiting means for limiting the speed of the leading vehicle 101, establishes an upper limit value for the accelerator control variable (motor torque) thereby to limit the maximum output power of the motor 44 for limiting the speed of travel of the leading vehicle 101.

Then, the leading vehicle 101 decides whether a following vehicle is suffering a failure or not in step S12. If a following vehicle is suffering a failure, then the leading vehicle 101 produces a stop alarm in step S13, prompting the driver to stop the leading vehicle 101. The driver then stops the leading vehicle 101 in step S14.

The leading vehicle 101 also decides whether the remaining capacity of the battery on a following vehicle is lowered or not in step S15. If the remaining capacity of the battery on even one of the following vehicles is lower than a predetermined level, e.g., 30% of the fully charged level, then since the maximum output power of that following vehicle is expected to be lower than a desired level, the leading vehicle 101 produces a slow-down alarm in step S10, prompting the driver of the leading vehicle 101 to slow down. The driver then lowers the speed of the leading vehicle 101 in step S11. At this time, the decelerating means 42, 44, 84, 86 (see FIG. 5) establishes an upper limit value for the accelerator control variable (motor torque) thereby to limit the maximum output power of the motor 44 for limiting the speed of travel of the leading vehicle 101. Thereafter, the control sequence of the leading vehicle shown in FIG. 7 is repeated from step S1.

In the above embodiment, as described above, the status of each of the following vehicles 102, 103 with respect to a malfunction thereof is detected, and status information is indicated to the driver of the leading vehicle 101 via the display unit 82 and/or the speaker 81. Based on the indicated status information, the driver of the leading vehicle 101 can recognize the following error or the malfunction, and take a necessary action to stop the leading vehicle 101, for example.

The remaining capacity of the battery on each of the following vehicles 102, 103 is detected, and displayed on the display unit 82 of the leading vehicle 101 and/or indicated by the speaker 81. The driver of the leading vehicle 101 can thus recognize a reduction in the remaining capacity of the battery on each of the following vehicles 102, 103 via the displayed image and/or the voice guidance, and can also know how much the remaining capacity of the battery is lowered.

The leading vehicle 101 which has detected a reduction in the remaining capacity of the battery on each of the following vehicles 102, 103 can automatically reduce the speed of the leading vehicle 101 or limit the maximum speed thereof, so that the vehicle platoon can continuously run at a relatively low speed at which the following vehicles 102, 103 can follow the leading vehicle 101.

The principles of the present invention are not limited to the above embodiment of the electric vehicles 10, but are also applicable to motor vehicles powered by internal combustion engines in which the output signal of a throttle valve opening sensor is used instead of the output signal of an accelerator sensor.

With the arrangement of the present invention, since an indicating means on a leading vehicle indicates malfunction information of a following vehicle to the driver of the leading vehicle, the leading vehicle itself or the driver of the leading vehicle can recognize a malfunction, and quickly take an appropriate action such as to slow down or stop the leading vehicle.

If a following vehicle is an electric vehicle, then the remaining capacity of the battery on the electric vehicle is detected and displayed on a display means on a leading vehicle. Therefore, the leading vehicle itself or the driver of the leading vehicle can recognize the remaining capacity of the battery on the following vehicle from the displayed information, and hence can take an appropriate action such as to slow down or stop the leading vehicle depending on the remaining capacity of the battery on the following vehicle.

Although a certain preferred embodiment of the present invention has been shown and described in detail, it should be understood that various changes and modifications may be made therein without departing from the scope of the appended claims.

What is claimed is:

1. An automatic vehicle following control system comprising a leading vehicle driven by a driver and a following vehicle automatically controllable to run in follow mode to the leading vehicle, said following vehicle comprising:
    status detecting means for detecting a status of the following vehicle; and
    transmitting means for transmitting the detected status of the following vehicle to said leading vehicle;
said leading vehicle comprising:
    receiving means for receiving the status of the following vehicle transmitted by said transmitting means; and
    indicating means for indicating a malfunction of the following vehicle if the received status of the following vehicle contains status information indicative of the malfunction.

2. An automatic vehicle following control system according to claim 1, wherein said following vehicle comprises a plurality of following vehicles running in a platoon following said leading vehicle, said indicating means comprising means for identifying and indicating at least one of said following vehicles which is suffering a malfunction.

3. An automatic vehicle following control system according to claim 1, for use as a vehicle sharing system having a limited area in which available vehicles can be used, said area having a plurality of ports for parking a plurality of vehicles, the arrangement being such that the vehicles can be automatically controlled to run in follow mode to the leading vehicle when moving from one of the ports in which more vehicles are parked to one of the ports in which fewer vehicles are parked.

4. An automatic vehicle following control system according to claim 1, wherein said leading vehicle further comprises:
    speed limiting means for limiting a speed of travel of the leading vehicle if the received status of the following vehicle contains status information indicative of the malfunction.

5. An automatic vehicle following control system according to claim 4, wherein said following vehicle comprises a plurality of following vehicles running in a platoon following said leading vehicle, said indicating means comprising means for identifying and indicating at least one of said following vehicles which is suffering a malfunction.

6. An automatic vehicle following control system comprising a leading vehicle driven by a driver and a plurality of following vehicles, each comprising an electric vehicle, which are automatically controllable to run in follow mode to the leading vehicle, each of said following vehicles comprising:
    remaining capacity detecting means for detecting a remaining capacity of a battery on the following vehicle; and
    transmitting means for transmitting information of the detected remaining capacity to said leading vehicle;
said leading vehicle comprising:
    receiving means for receiving the information of the detected remaining capacity transmitted by the transmitting means of each of the following vehicles; and
    display means for displaying the received information of the remaining capacity of the battery on each of said following vehicles.

7. An automatic vehicle following control system according to claim 6, wherein sad leading vehicle further comprises:
    speed limiting means for limiting a speed of travel of the leading vehicle if the remaining capacity of the battery on at least one of the following vehicles is lower than a predetermined level.

8. An automatic vehicle following control system according to claim 6, for use as a vehicle sharing system having a limited area in which available vehicles can be used, said area having a plurality of ports for parking a plurality of vehicles, the arrangement being such that the vehicles can be automatically controlled to run in follow mode to the leading vehicle when moving from one of the ports in which more vehicles are parked to one of the ports in which fewer vehicles are parked.

9. An automatic vehicle following control system according to claim 6, wherein sad leading vehicle further comprises:
    indicating means for indicating a reduction in the remaning capacity of the battery if the remaining capacity of the battery on at least one of the following vehicles is lower than a predetermined level.

10. an automatic vehicle following control system according to claim 9, wherein sad leading vehicle further comprises:
    speed limiting means for limiting a speed of travel of the leading vehicle if the remaining capacity of the battery on at least one of the following vehicles is lower than a predetermined level.

* * * * *